(12) United States Patent
Wenren et al.

(10) Patent No.: US 11,698,514 B2
(45) Date of Patent: Jul. 11, 2023

(54) IMAGING LENS ASSEMBLY

(71) Applicant: Zhejiang Sunny Optical Co., Ltd, Ningbo (CN)

(72) Inventors: Jianke Wenren, Ningbo (CN); Yuhao Wang, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 440 days.

(21) Appl. No.: 16/834,246

(22) Filed: Mar. 30, 2020

(65) Prior Publication Data
US 2020/0225453 A1 Jul. 16, 2020

Related U.S. Application Data

(63) Continuation of application No. PCT/CN2019/081365, filed on Apr. 4, 2019.

(30) Foreign Application Priority Data

Jun. 1, 2018 (CN) .......................... 201810555376.7

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC ............. H04N 5/2254; G02B 27/0012; G02B 27/0025; G02B 13/0055; G02B 13/06;
(Continued)

(56) References Cited

U.S. PATENT DOCUMENTS 4,900,139 A * 2/1990 Kreitzer ................ G02B 13/18
359/708
5,214,537 A * 5/1993 Maruyama ............ G02B 13/24
359/660
(Continued)

FOREIGN PATENT DOCUMENTS

CN 101295070 A 10/2008
CN 101339290 A 1/2009
(Continued)

OTHER PUBLICATIONS

International Search Report (PCT/ISA/210) dated Jun. 27, 2019, issued by the International Searching Authority in counterpart International Application No. PCT/CN2019/081365.
(Continued)

*Primary Examiner* — Travis S Fissel
(74) *Attorney, Agent, or Firm* — Sughrue Mion, PLLC

(57) ABSTRACT

The present disclosure discloses an imaging lens assembly. Sequentially from an object side to an image side along an optical axis, the imaging lens assembly includes a first lens having a positive refractive power; a second lens having a negative refractive power, and both an object-side surface and an image-side surface thereof being concave surfaces; a third lens having a positive refractive power, and an image-side surface thereof being a convex surface; a fourth lens having a negative refractive power, and an object-side surface thereof being a concave surface; a fifth lens having a refractive power; and a sixth lens having a refractive power. A total effective focal length f of the imaging lens assembly and half of a diagonal length ImgH of an effective pixel area on an imaging plane of the imaging lens assembly satisfy $2.0 \leq f/ImgH \leq 3.0$.

14 Claims, 13 Drawing Sheets

(58) Field of Classification Search
CPC ........ G02B 13/18; G02B 13/001; G02B 3/04;
G02B 9/62; G02B 9/64
USPC ........ 359/757, 756, 713, 754, 751, 750, 766
See application file for complete search history.

(56) References Cited

U.S. PATENT DOCUMENTS

| | | | | |
|---|---|---|---|---|
| 6,118,585 | A | * | 9/2000 | Kanai .................... G02B 23/18 359/557 |
| 2008/0049335 | A1 | | 2/2008 | Tomioka |
| 2008/0204896 | A1 | * | 8/2008 | Shyu ....................... G02B 9/12 359/708 |
| 2009/0009884 | A1 | | 1/2009 | Ohtake et al. |
| 2009/0059395 | A1 | * | 3/2009 | Lin ......................... G02B 13/22 359/761 |
| 2015/0077862 | A1 | * | 3/2015 | Lin ......................... G02B 13/04 359/714 |
| 2016/0124192 | A1 | * | 5/2016 | Koreeda ............ G02B 27/0025 359/713 |
| 2016/0356989 | A1 | * | 12/2016 | Kubota .................... G02B 9/62 |

FOREIGN PATENT DOCUMENTS

| | | | |
|---|---|---|---|
| CN | 202886714 U | | 4/2013 |
| CN | 203422521 U | | 2/2014 |
| CN | 103676109 A | | 3/2014 |
| CN | 104330875 A | | 2/2015 |
| CN | 104423017 A | | 3/2015 |
| CN | 104503068 A | | 4/2015 |
| CN | 204536635 U | | 8/2015 |
| CN | 204679707 U | | 9/2015 |
| CN | 205281004 U | | 6/2016 |
| CN | 205333956 U | | 6/2016 |
| CN | 105807407 A | | 7/2016 |
| CN | 205450424 U | | 8/2016 |
| CN | 106154491 A | | 11/2016 |
| CN | 106226888 A | | 12/2016 |
| CN | 106324799 A | * | 1/2017 |
| CN | 106324799 A | | 1/2017 |
| CN | 106597634 A | | 4/2017 |
| CN | 106646833 A | | 5/2017 |
| CN | 106802471 A | | 6/2017 |
| CN | 106873129 A | | 6/2017 |
| CN | 106990508 A | | 7/2017 |
| CN | 106990511 A | | 7/2017 |
| CN | 107765393 A | | 3/2018 |
| CN | 107783255 A | | 3/2018 |
| CN | 107783260 A | | 3/2018 |
| CN | 108469668 A | | 8/2018 |
| CN | 208477187 U | * | 2/2019 |
| JP | 61-148414 A | | 7/1986 |
| JP | 61-156014 A | | 7/1986 |
| JP | 2015-225246 A | | 12/2015 |
| WO | 2014/175058 A1 | | 10/2014 |

OTHER PUBLICATIONS

Communication dated Nov. 3, 2021, issued in Indian Application No. 202047016111.

* cited by examiner

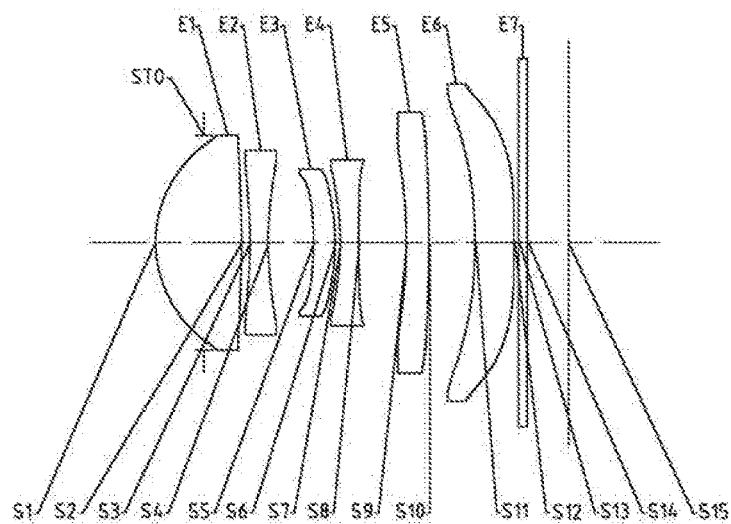
Fig. 7
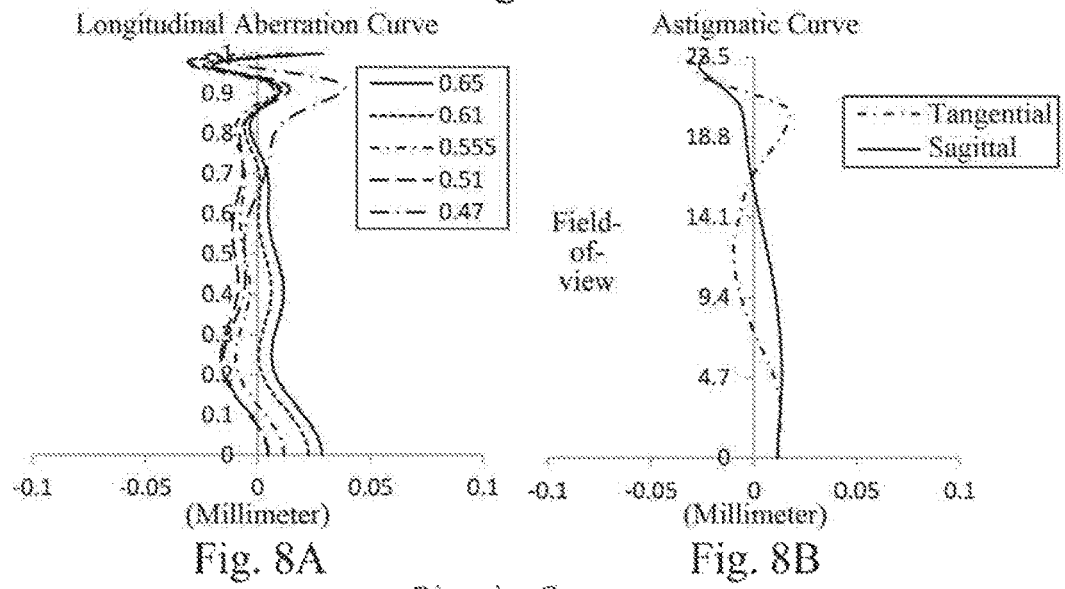
Fig. 8A
Fig. 8B
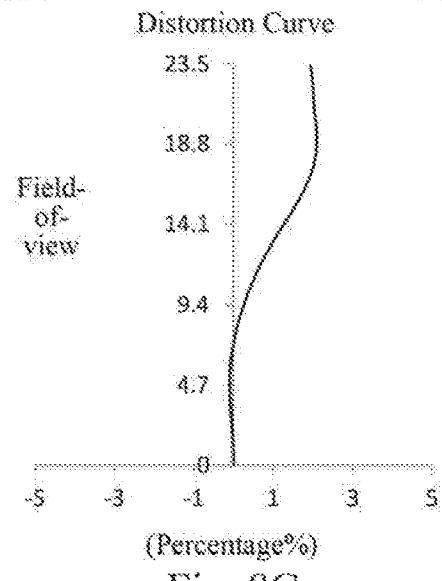
Fig. 8C

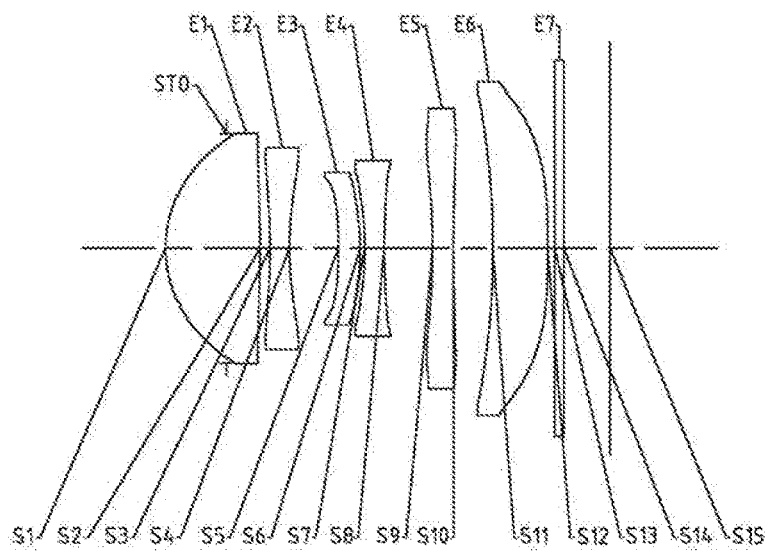
Fig. 25
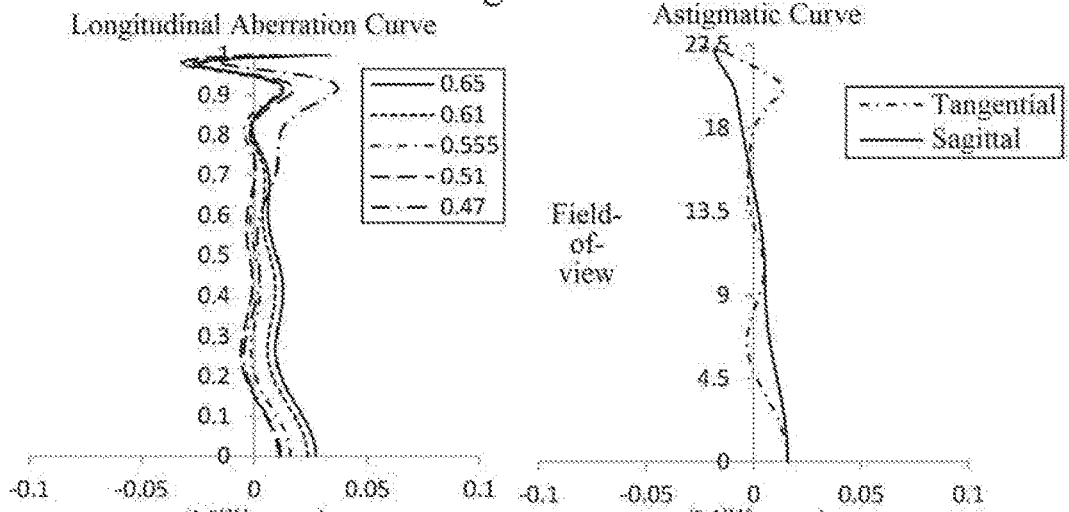
Fig. 26A
Fig. 26B
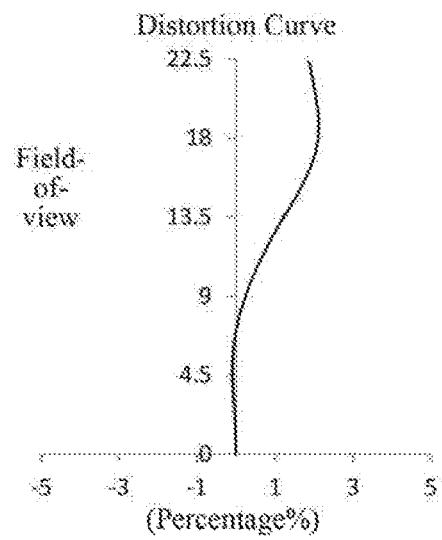
Fig. 26C

IMAGING LENS ASSEMBLY

CROSS-REFERENCE TO RELATED APPLICATIONS

The present patent application is a continuation of International Application No. PCT/CN2019/081365, filed on Apr. 4, 2019, which claims the priority from Chinese Patent Application No. 201810555376.7, filed before the China National Intellectual Property Administration (CNIPA) on Jun. 1, 2018. Both of the aforementioned patent applications are hereby incorporated by reference in their entireties.

TECHNICAL FIELD

The present disclosure relates to an imaging lens assembly, specifically to an imaging lens assembly including six lenses.

BACKGROUND

On one hand, with the improvement of performance and the reduction of size of image sensors such as Charge Coupled Device (CCD) or Complementary Metal-Oxide Semiconductor (CMOS), the corresponding imaging lens assembly are expected to meet higher requirements for good image quality and miniaturization. On the other hand, as the portable electronic products, such as mobile phones and tablet computers, are becoming thinner and lighter, the corresponding imaging lens assembly are also need to be thinner and smaller.

In order to meet the demand for miniaturization, the number of lens of the imaging lens assembly is required to be reduced as much as possible, however, reducing the number of lens will cause a lack of freedom in the design of lens assembly, which in turn make it difficult for the lens assembly to meet the requirements of high imaging performance. In addition, in order to obtain an image with wide field-of-view, present camera lens assembly mostly use a wide-angle optical system, but this makes the lens assembly unfavorable for capturing distant objects and cannot obtain an image with high definition.

The emerging dual-camera technology uses a combination of a long-focus lens assembly and a wide-angle lens assembly. Therefore, a high spatial angular resolution can be obtained through the long-focus lens assembly, and then a high-frequency information enhancement is achieved through image fusion technology. However, in this dual-camera lens assembly, the design for the long-focus lens assembly is particularly important, and especially, the long-focus lens assembly is required to meet the characteristics of long-focus and ultra-thin.

SUMMARY

The present disclosure provides an imaging lens assembly such as a long-focus lens assembly that at least or partially addresses at least one of the above disadvantages of the prior art.

In one aspect, the present disclosure provides an imaging lens assembly, which may include, sequentially from an object side to an image side along an optical axis, a first lens, a second lens, a third lens, a fourth lens, a fifth lens and a sixth lens. The first lens may have a positive refractive power; the second lens may have a negative refractive power, and both an object-side surface and an image-side surface thereof may be concave surfaces; the third lens may have a positive refractive power, and an image-side surface thereof may be a convex surface; the fourth lens may have a negative refractive power, and an object-side surface thereof may be a concave surface; and each of the fifth lens and the sixth lens has a positive refractive power or a negative refractive power. Here, a total effective focal length f of the imaging lens assembly and half of a diagonal length ImgH of an effective pixel area on an imaging plane of the imaging lens assembly may satisfy $2.0 \le f/\text{ImgH} \le 3.0$.

In one implementation, the total effective focal length f of the imaging lens assembly and a spaced distance T23 along the optical axis between the second lens and the third lens may satisfy $8 < f/T23 \le 12$.

In one implementation, a combined focal length f12 of the first lens and the second lens and a center thickness CT1 along the optical axis of the first lens may satisfy $3 < f12/CT1 < 4.5$.

In one implementation, a spaced distance T45 along the optical axis between the fourth lens and the fifth lens, a spaced distance T56 along the optical axis between the fifth lens and the sixth lens, and a sum of spaced distances $\Sigma AT$ along the optical axis between two adjacent lenses of the first lens to the sixth lens may satisfy $0.5 \le (T45+T56)/\Sigma AT < 0.9$.

In one implementation, a radius of curvature R5 of an object-side surface of the third lens and a radius of curvature R8 of an image-side surface of the fourth lens may satisfy $-1.5 < R5/R8 < -0.5$.

In one implementation, a radius of curvature R6 of the image-side surface of the third lens and a radius of curvature R7 of the object-side surface of the fourth lens may satisfy $0 < R6/R7 < 1.0$.

In one implementation, the total effective focal length f of the imaging lens assembly and an effective focal length f3 of the third lens may satisfy $0.6 < f/f3 \le 1.0$.

In one implementation, the total effective focal length f of the imaging lens assembly and an effective focal length f4 of the fourth lens may satisfy $-1.5 < f/f4 < -1.0$.

In one implementation, the total effective focal length f of the imaging lens assembly, a radius of curvature R9 of an object-side surface of the fifth lens and a radius of curvature R10 of an image-side surface of the fifth lens may satisfy $|f/R9|+|f/R10|<1.2$.

In one implementation, the total effective focal length f of the imaging lens assembly, a radius of curvature R11 of an object-side surface of the sixth lens and a radius of curvature R12 of an image-side surface of the sixth lens may satisfy $0.5 \le |f/R11|+|f/R12|<1.5$.

In one implementation, the total effective focal length f of the imaging lens assembly, an effective focal length f5 of the fifth lens and an effective focal length f6 of the sixth lens may satisfy $0.5 \le |f/f5|+|f/f6|<1.0$.

In one implementation, the total effective focal length f of the imaging lens assembly and a radius of curvature R2 of an image-side surface of the first lens may satisfy $-1.0 < f/R2 < 0$.

In one implementation, the total effective focal length f of the imaging lens assembly and an entrance pupil diameter EPD of the imaging lens assembly may satisfy $f/EPD < 2.5$.

In another aspect, the present disclosure provides an imaging lens assembly, which may include, sequentially from an object side to an image side along an optical axis, a first lens, a second lens, a third lens, a fourth lens, a fifth lens and a sixth lens. The first lens may have a positive refractive power; the second lens may have a negative refractive power, and both an object-side surface and an image-side surface thereof may be concave surfaces; the third lens may have a positive refractive power, and an image-side surface thereof may be a convex surface; the fourth lens may have a negative refractive power, and an object-side surface thereof may be a concave surface; and each of the fifth lens and the sixth lens has a positive refractive power or a negative refractive power. Here, an effective focal length f of the imaging lens assembly, an effective focal length f5 of the fifth lens and an effective focal length f6 of the sixth lens may satisfy $0.5 \leq |f/f5|+|f/f6| < 1.0$.

In one implementation, a combined focal length f12 of the first lens and the second lens and a center thickness CT1 along the optical axis of the first lens may satisfy $3 < f12/CT1 < 4.5$.

In one implementation, the total effective focal length f of the imaging lens assembly and an effective focal length f3 of the third lens may satisfy $0.6 < f/f3 \leq 1.0$.

In one implementation, the total effective focal length f of the imaging lens assembly and an effective focal length f4 of the fourth lens may satisfy $-1.5 < f/f4 < -1.0$.

In one implementation, a spaced distance T45 along the optical axis between the fourth lens and the fifth lens, a spaced distance T56 along the optical axis between the fifth lens and the sixth lens, and a sum of spaced distances $\Sigma AT$ along the optical axis between two adjacent lenses of the first lens to the sixth lens may satisfy $0.5 \leq (T45+T56)/\Sigma AT < 0.9$.

In one implementation, the total effective focal length f of the imaging lens assembly and a spaced distance T23 along the optical axis between the second lens and the third lens satisfy $8 < f/T23 < 12$.

In one implementation, the total effective focal length f of the imaging lens assembly and a radius of curvature R2 of an image-side surface of the first lens may satisfy $-1.0 < f/R2 < 0$.

In one implementation, a radius of curvature R5 of an object-side surface of the third lens and a radius of curvature R8 of an image-side surface of the fourth lens may satisfy $-1.5 < R5/R8 < -0.5$.

In one implementation, a radius of curvature R6 of the image-side surface of the third lens and a radius of curvature R7 of the object-side surface of the fourth lens may satisfy $0 < R6/R7 < 1.0$.

In one implementation, the total effective focal length f of the imaging lens assembly, a radius of curvature R9 of an object-side surface of the fifth lens and a radius of curvature R10 of an image-side surface of the fifth lens may satisfy $|f/R9|+|f/R10| < 1.2$.

In one implementation, the total effective focal length f of the imaging lens assembly, a radius of curvature R11 of an object-side surface of the sixth lens and a radius of curvature R12 of an image-side surface of the sixth lens may satisfy $0.5 \leq |f/R11|+|f/R12| < 1.5$.

In one implementation, the total effective focal length f of the imaging lens assembly and an entrance pupil diameter EPD of the imaging lens assembly may satisfy $f/EPD < 2.5$.

In one implementation, the total effective focal length f of the imaging lens assembly and half of a diagonal length ImgH of an effective pixel area on an imaging plane of the imaging lens assembly may satisfy $2.0 \leq f/ImgH \leq 3.0$.

In still another aspect, the present disclosure provides an imaging lens assembly, which may include, sequentially from an object side to an image side along an optical axis, a first lens, a second lens, a third lens, a fourth lens, a fifth lens and a sixth lens. The first lens has a refractive power, and an object-side surface thereof is a convex surface; the second lens has a refractive power, and an image-side surface thereof is a concave surface; the third lens has a refractive power; the fourth lens has a refractive power, and an object-side surface thereof is a concave surface; the fifth lens has a refractive power; and the sixth lens has a refractive power. Here, a total effective focal length f of the imaging lens assembly and an entrance pupil diameter EPD of the imaging lens assembly satisfy $2.18 \leq f/EPD \leq 2.48$; and a distance TTL along the optical axis from the object-side surface of the first lens to an imaging plane of the imaging lens assembly and half of a diagonal length ImgH of an effective pixel area on the imaging plane of the imaging lens assembly satisfy $2.07 \leq TTL/ImgH \leq 2.18$.

In one implementation, a center thickness CT3 along the optical axis of the third lens and a center thickness CT2 along the optical axis of the second lens satisfy $CT3/CT2 \leq 1.23$.

In one implementation, a center thickness CT4 along the optical axis of the fourth lens and a center thickness CT5 along the optical axis of the fifth lens satisfy $1.06 \leq CT5/CT4 \leq 1.47$.

In one implementation, the distance TTL along the optical axis from the object-side surface of the first lens to the imaging plane of the imaging lens assembly and the total effective focal length f of the imaging lens assembly satisfy $TTL/f > 0.9$.

In one implementation, at least two lenses of the first lens to the sixth lens have a center thickness greater than 0.5 mm.

In one implementation, the total effective focal length f of the imaging lens assembly and a radius of curvature R1 of the object-side surface of the first lens satisfy $f/R1 < 3.94$.

In one implementation, an object-side surface of the fifth lens is a convex surface.

In one implementation, an image-side surface of the fifth lens is a concave surface.

In one implementation, an image-side surface of the sixth lens is a concave surface.

In one implementation, a sum of the center thicknesses $\Sigma CT$ along the optical axis of the first lens to the sixth lens and a sum of spaced distances $\Sigma AT$ along the optical axis between two adjacent lenses of the first lens to the sixth lens satisfy $1.26 \leq \Sigma CT/\Sigma AT < 1.57$.

In one implementation, the total effective focal length f of the imaging lens assembly and half of the diagonal length ImgH of the effective pixel area on the imaging plane of the imaging lens assembly satisfy $2.0 \leq f/ImgH \leq 2.5$.

In one implementation, half of a maximal field-of-view HFOV of the imaging lens assembly satisfies $HFOV \geq 22.4°$.

In one implementation, a radius of curvature R1 of the object-side surface of the first lens and a radius of curvature R2 of an image-side surface of the first lens satisfy $-0.90 \leq (R1+R2)/(R1-R2) \leq -0.75$.

In one implementation, a radius of curvature R8 of an image-side surface of the fourth lens and a radius of curvature R6 of an image-side surface of the third lens satisfy $-2.72 \leq R8/R6 < -1.44$.

In yet another aspect, the present disclosure provides an imaging lens assembly, which may include, sequentially from an object side to an image side along an optical axis, a first lens, a second lens, a third lens, a fourth lens, a fifth lens and a sixth lens. The first lens has a refractive power, and an object-side surface thereof is a convex surface; the second lens has a refractive power, and an image-side surface thereof is a concave surface; the third lens has a refractive power; the fourth lens has a refractive power, and an object-side surface thereof is a concave surface; the fifth lens has a refractive power; and the sixth lens has a refractive power. Here, a radius of curvature R1 of the object-side surface of the first lens and a radius of curvature R2 of an image-side surface of the first lens satisfy $-0.90 \leq (R1+R2)/$ (R1−R2)≤−0.75; and a radius of curvature R8 of an image-side surface of the fourth lens and a radius of curvature R6 of an image-side surface of the third lens satisfy −2.72≤R8/R6≤−1.44.

In one implementation, a total effective focal length f of the imaging lens assembly and an entrance pupil diameter EPD of the imaging lens assembly satisfy 2.18≤f/EPD≤2.48.

In one implementation, a distance TTL along the optical axis from the object-side surface of the first lens to an imaging plane of the imaging lens assembly and half of a diagonal length ImgH of an effective pixel area on the imaging plane of the imaging lens assembly satisfy 2.07≤TTL/ImgH≤2.18.

In one implementation, a center thickness CT3 along the optical axis of the third lens and a center thickness CT2 along the optical axis of the second lens satisfy CT3/CT2≤1.23.

In one implementation, a center thickness CT4 along the optical axis of the fourth lens and a center thickness CT5 along the optical axis of the fifth lens satisfy 1.06≤CT5/CT4≤1.47.

In one implementation, a distance TTL along the optical axis from the object-side surface of the first lens to an imaging plane of the imaging lens assembly and a total effective focal length f of the imaging lens assembly satisfy TTL/f>0.9.

In one implementation, at least two lenses of the first lens to the sixth lens have a center thickness greater than 0.5 mm.

In one implementation, a total effective focal length f of the imaging lens assembly and a radius of curvature R1 of the object-side surface of the first lens satisfy f/R1<3.94.

In one implementation, an object-side surface of the fifth lens is a convex surface.

In one implementation, an image-side surface of the fifth lens is a concave surface.

In one implementation, an image-side surface of the sixth lens is a concave surface.

In one implementation, a sum of the center thicknesses ΣCT along the optical axis of the first lens to the sixth lens and a sum of spaced distances ΣAT along the optical axis between two adjacent lenses of the first lens to the sixth lens satisfy 1.26≤ΣCT/ΣAT≤1.57.

In one implementation, a total effective focal length f of the imaging lens assembly and half of a diagonal length ImgH of an effective pixel area on an imaging plane of the imaging lens assembly satisfy 2.0≤f/ImgH≤2.5.

In one implementation, half of a maximal field-of-view HFOV of the imaging lens assembly satisfies HFOV≥22.4°.

In yet another aspect, the present disclosure provides an imaging lens assembly, which may include, sequentially from an object side to an image side along an optical axis, a first lens, a second lens, a third lens, a fourth lens, a fifth lens and a sixth lens. The first lens has a refractive power, and an object-side surface thereof is a convex surface, and an image-side surface thereof is a convex surface; the second lens has a refractive power, and an image-side surface thereof is a concave surface; the third lens has a refractive power; the fourth lens has a refractive power, and an object-side surface thereof is a concave surface; the fifth lens has a refractive power; and the sixth lens has a refractive power. Here, a radius of curvature R5 of an object-side surface of the third lens and a radius of curvature R8 of an image-side surface of the fourth lens satisfy −1.5<R5/R8≤−0.76; and a total effective focal length f of the imaging lens assembly and an effective focal length f2 of the second length satisfy −1.54≤f/f2≤−1.31.

In one implementation, a center thickness CT6 along the optical axis of the sixth lens, a center thickness CT3 along the optical axis of the third lens and a center thickness CT4 along the optical axis of the fourth lens satisfy 0.86≤CT6/(CT3+CT4)≤1.41.

In one implementation, a spaced distance T23 along the optical axis between the second lens and the third lens, a spaced distance T34 along the optical axis between the third lens and the fourth lens and a center thickness CT6 along the optical axis of the sixth lens satisfy 0.78≤(T23+T34)/CT6≤1.46.

In one implementation, a center thickness CT2 along the optical axis of the second lens and a spaced distance T12 along the optical axis between the first lens and the second lens satisfy 1.83≤CT2/T12≤2.28.

In one implementation, an effective focal length f1 of the first lens and a radius of curvature R1 of the object-side surface of the first lens satisfy 1.65≤f1/R1≤1.76.

In one implementation, the effective focal length f2 of the second lens, a center lens CT2 along the optical axis of the second lens and the total effective focal length f of the imaging lens assembly satisfy 2.68≤|f2/CT2|/f≤3.19.

In one implementation, the total effective focal length f of the imaging lens assembly, an entrance pupil diameter EPD of the imaging lens assembly and an effective focal length f1 of the first lens satisfy 0.45≤f/(f/EPD*f1*2)≤0.54.

In one implementation, a radius of curvature R3 of an object-side surface of the second lens, a radius of curvature R4 of an image-side surface of the second lens and the total effective focal length f of the imaging lens assembly satisfy 1.99≤(|R3|+R4)/f≤3.27.

In one implementation, an object-side surface of the fifth lens is a convex surface.

In one implementation, an image-side surface of the fifth lens is a concave surface.

In one implementation, an image-side surface of the sixth lens is a concave surface.

In one implementation, a distance TTL along the optical axis from the object-side surface of the first lens to an imaging plane of the imaging lens assembly and the total effective focal length f of the imaging lens assembly satisfy TTL/f≥0.9.

In one implementation, half of a maximal field-of-view HFOV of the imaging lens assembly satisfies HFOV≥22.4°.

In one implementation, a radius of curvature R7 of the object-side surface of the fourth lens and the effective focal length f2 of the second lens satisfy 0.93≤R7/f2≤1.85.

In one implementation, the radius of curvature R8 of the image-side surface of the fourth lens and a radius of curvature R6 of an image-side surface of the third lens satisfy −2.72≤R8/R6≤−1.44.

In yet another aspect, the present disclosure provides an imaging lens assembly, which may include, sequentially from an object side to an image side along an optical axis, a first lens, a second lens, a third lens, a fourth lens, a fifth lens and a sixth lens. The first lens has a refractive power, and an object-side surface thereof is a convex surface, and an image-side surface thereof is a convex surface; the second lens has a refractive power, and an image-side surface thereof is a concave surface; the third lens has a refractive power; the fourth lens has a refractive power, and an object-side surface thereof is a concave surface; the fifth lens has a refractive power; and the sixth lens has a refractive power.

Here, a radius of curvature R7 of the object-side surface of the fourth lens and the effective focal length f2 of the second lens satisfy 0.93≤R7/f2≤1.85; and a radius of curvature R8 of an image-side surface of the fourth lens and a radius of curvature R6 of an image-side surface of the third lens satisfy $-2.72 \leq R8/R6 \leq -1.44$.

In one implementation, a radius of curvature R5 of an object-side surface of the third lens and the radius of curvature R8 of the image-side surface of the fourth lens satisfy $-1.5 < R5/R8 \leq -0.76$.

In one implementation, a total effective focal length of the imaging lens assembly and an effective focal length f2 of the second length satisfy $-1.54 \leq f/f2 \leq -1.31$.

In one implementation, a center thickness CT6 along the optical axis of the sixth lens, a center thickness CT3 along the optical axis of the third lens and a center thickness CT4 along the optical axis of the fourth lens satisfy $0.86 \leq CT6/(CT3+CT4) \leq 1.41$.

In one implementation, a spaced distance T23 along the optical axis between the second lens and the third lens, a spaced distance T34 along the optical axis between the third lens and the fourth lens and a center thickness CT6 along the optical axis of the sixth lens satisfy $0.78 \leq (T23+T34)/CT6 \leq 1.46$.

In one implementation, a center thickness CT2 along the optical axis of the second lens and a spaced distance T12 along the optical axis between the first lens and the second lens satisfy $1.83 \leq CT2/T12 \leq 2.28$.

In one implementation, an effective focal length f1 of the first lens and a radius of curvature R1 of the object-side surface of the first lens satisfy $1.65 \leq f1/R1 \leq 1.76$.

In one implementation, the effective focal length f2 of the second lens, a center lens CT2 along the optical axis of the second lens and an total effective focal length f of the imaging lens assembly satisfy $2.68 \leq |f2/CT2|/f \leq 3.19$.

In one implementation, an total effective focal length f of the imaging lens assembly, an entrance pupil diameter EPD of the imaging lens assembly and an effective focal length f1 of the first lens satisfy $0.45 \leq f/(f/EPD*f1*2) \leq 0.54$.

In one implementation, a radius of curvature R3 of an object-side surface of the second lens, a radius of curvature R4 of an image-side surface of the second lens and a total effective focal length f of the imaging lens assembly satisfy $1.99 \leq (|R3|+R4)/f \leq 3.27$.

In one implementation, an object-side surface of the fifth lens is a convex surface.

In one implementation, an image-side surface of the fifth lens is a concave surface.

In one implementation, an image-side surface of the sixth lens is a concave surface.

In one implementation, a distance TTL along the optical axis from the object-side surface of the first lens to an imaging plane of the imaging lens assembly and a total effective focal length f of the imaging lens assembly satisfy $TTL/f \geq 0.9$.

In one implementation, half of a maximal field-of-view HFOV of the imaging lens assembly satisfies $HFOV \geq 22.4°$.

The present disclosure employs a plurality of (for example, six) lenses, and the imaging lens assembly described above has at least one advantageous effect such as miniaturization, long-focus, high imaging quality and good matching with high-resolution chips and the like by properly disposing the refractive power, the surface shape, the center thickness of each lens, and the spaced distance along the optical axis between the lenses.

BRIEF DESCRIPTION OF THE DRAWINGS

Other features, purpose and advantages of the present disclosure will become apparent through detailed description of the non-limiting implementations given in conjunction with the accompanying drawings. In the drawings:

FIG. 7 is a schematic structural view of an imaging lens assembly according to embodiment 4 of the present disclosure; FIGS. 8A to 8C illustrates a longitudinal aberration curve, an astigmatism curve and a distortion curve of the imaging lens assembly according to embodiment 4, respectively;

FIG. 25 is a schematic structural view of an imaging lens assembly according to embodiment 13 of the present disclosure; FIGS. 26A to 26C illustrates a longitudinal aberration curve, an astigmatism curve and a distortion curve of the imaging lens assembly according to embodiment 13, respectively.

DETAILED DESCRIPTION OF EMBODIMENTS

Figure 1:
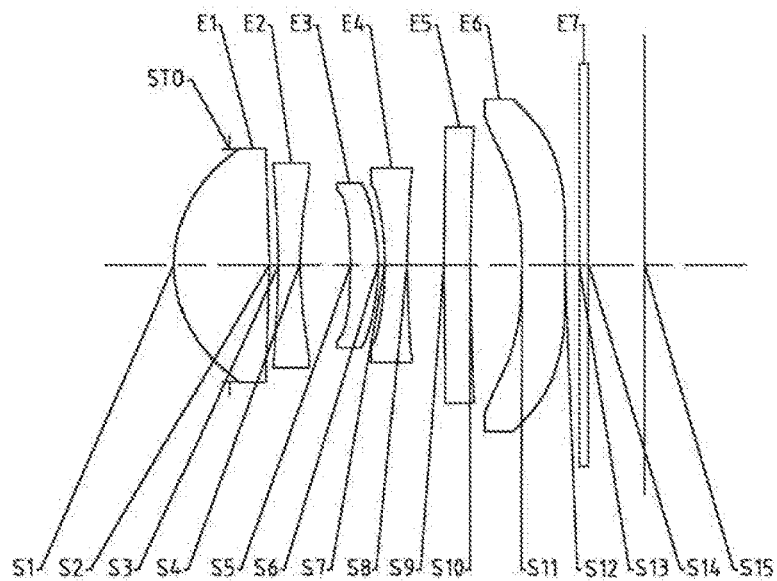
FIG. 1 is a schematic structural view of an imaging lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second, third and the like are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; if a surface of a lens is a concave surface and the position of the concave is not defined, it indicates that the surface of the lens is concave at least in the paraxial region. In each lens, the surface closest to the object side is referred to as an object-side surface, and the surface closest to the image side is referred to as an image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An imaging lens assembly according to exemplary implementations of the present disclosure may include, for example, sixth lenses having refractive power, i.e., a first lens, a second lens, a third lens, a fourth lens, a fifth lens and a sixth lens. These six lenses are sequentially arranged from an object side to an image side along an optical axis.

In an exemplary implementation, the first lens may have a positive refractive power; the second lens may have a negative refractive power, and an object-side surface thereof may be a concave surface and an image-side surface thereof may also be a concave surface; the third lens may have a positive refractive power, and an image-side surface thereof may be a convex surface; the fourth lens may have a negative refractive power, and an object-side surface thereof may be a concave surface; the fifth lens has a positive refractive power or a negative refractive power; the sixth lens has a positive refractive power or a negative refractive power. By properly controlling the refractive powers and surface shapes of the first lens to the fourth lens, the low-order aberrations of the system can be effectively compensated, so that the system has good imaging quality.

In an exemplary implementation, each of an object-side surface and an image-side surface of the first lens may be a convex surface.

In an exemplary implementation, an object-side surface of the third lens may be a concave surface.

In an exemplary implementation, an image-side surface of the fourth lens may be a concave surface.

In an exemplary implementation, an object-side surface of the sixth lens may be a concave surface.

In an exemplary implementation, the imaging lens assembly of the present disclosure may satisfy $2.0 \leq f/ImgH \leq 3.0$, where f is a total effective focal length of the imaging lens assembly, and ImgH is half of a diagonal length of an effective pixel area on an imaging plane of the imaging lens assembly. More specifically, f and ImgH may further satisfy $2.0 \leq f/ImgH \leq 2.5$, for example, $2.27 \leq f/ImgH \leq 2.40$. Satisfying the formula $2.0 \leq f/ImgH \leq 3.0$ is beneficial to ensure the lens assembly have good imaging quality.

In an exemplary implementation, the imaging lens assembly of the present disclosure may satisfy $8 < f/T23 < 12$, where f is the total effective focal length of the imaging lens assembly and T23 is a spaced distance along the optical axis between the second lens and the third lens. More specifically, f and T23 may further satisfy $9.5 < f/T23 < 10.5$, for example, $9.87 \leq f/T23 \leq 10.15$. By controlling the spaced distances between the lenses, the telephoto ratio of the imaging lens assembly can be effectively improved, the magnification of the imaging lens assembly on object can be increased, and the imaging quality can be improved.

In an exemplary implementation, the imaging lens assembly of the present disclosure may satisfy 3<f12/CT1<4.5, where f12 is a combined focal length of the first lens and the second lens, and CT1 is a center thickness along the optical axis of the first lens. More specifically, f12 and CT1 may further satisfy 3.5<f12/CT1<4.5, for example 3.72≤f12/CT1≤4.15. By properly controlling the combined focal length of the first lens and the second lens, light deflection can be effectively controlled and the size of the front end of the system can be reduced.

In an exemplary implementation, the imaging lens assembly of the present disclosure may satisfy 0.5≤(T45+T56)/ΣAT<0.9, where T45 is a spaced distance along the optical axis between the fourth lens and the fifth lens, T56 is a spaced distance along the optical axis between the fifth lens and the sixth lens, and ΣAT is a sum of spaced distances along the optical axis between any two adjacent lenses of the first lens to the sixth lens. More specifically, T45, T56 and ΣAT may further satisfy 0.5≤(T45+T56)/ΣAT<0.7, for example 0.57≤(T45+T56)/ΣAT≤0.63. The air intervals from the fourth lens to the sixth lens accounts for a larger proportion of the total air intervals of the system, which can effectively increase the total focal length of the lens assembly and also ensure the optical system to have a better ability of compensating chromatic dispersion.

In an exemplary implementation, the imaging lens assembly of the present disclosure may satisfy 0.6<f/f3<1.0, where f is the total effective focal length of the imaging lens assembly, and f3 is an effective focal length of the third lens. More specifically, f and f3 may further satisfy 0.73≤f/f3≤0.99. By properly selecting the effective focal length of the third lens, the third lens may have a larger positive refractive power, which is advantageous to enable the optical system to have a better ability of compensating field curvature.

In an exemplary implementation, the imaging lens assembly of the present disclosure may satisfy −1.5<f/f4<−1.0, where f is the total effective focal length of the imaging lens assembly, f4 is an effective focal length of the fourth lens. More specifically, f and f4 may further satisfy −1.37≤f/f4≤−1.15. By controlling the negative refractive power of the fourth lens to be within a suitable range, the total focal length of the lens assembly can be increased, and at the same time, the field curvature can be also compensated.

In an exemplary implementation, the imaging lens assembly of the present disclosure may satisfy 0.5≤|f/f5|+|f/f6|<1.0, where f is the total effective focal length of the imaging lens assembly, f5 is an effective focal length of the fifth lens, and f6 is an effective focal length of the sixth lens. More specifically, f, f5 and f6 may further satisfy 0.53≤|f/f5|'|f/f6|≤0.84. By properly assigning the focal lengths of the fifth lens and the sixth lens, and controlling the refractive power of the rear end of the system to be within a smaller range, the deflection angle of the light can be reduced, thereby reducing the sensitivity of the system.

In an exemplary implementation, the imaging lens assembly of the present disclosure may satisfy −1.5<R5/R8<−0.5, where R5 is a radius of curvature of an object-side surface of the third lens, and R8 is a radius of curvature of an image-side surface of the fourth lens. More specifically, R5 and R8 may further satisfy −1.42≤R5/R8≤−0.76. Properly setting the radius of curvature of the object-side surface of the third lens and the radius of curvature of the image-side surface of the fourth lens makes it is easier for the optical system to compensate field curvature and distortion.

In an exemplary implementation, the imaging lens assembly of the present disclosure may satisfy 0<R6/R7<1.0, where R6 is a radius of curvature of an image-side surface of the third lens, and R7 is a radius of curvature of an object-side surface of the fourth lens. More specifically, R6 and R7 may further satisfy 0.3<R6/R7<0.7, for example, 0.38≤R6/R7≤0.61. By properly setting the radius of curvature of the image-side surface of the third lens and the radius of curvature of the object-side surface of the fourth lens, the optical system may have a larger aperture, and thereby improving the overall brightness of the image.

In an exemplary implementation, the imaging lens assembly of the present disclosure may satisfy −1.0<f/R2<0, for example, f is an total effective focal length of the imaging lens assembly, and R2 is a radius of curvature of an image-side surface of the first lens. More specifically, f and R2 may further satisfy −0.6<f/R2<−0.1, for example, −0.56≤f/R2≤−0.21. Properly setting the radius of curvature of the first lens makes it is easier to compensate aberrations and improve the modulation transfer function (MTF) performance of the system.

In an exemplary implementation, the imaging lens assembly of the present disclosure may satisfy |f/R9|+|f/R10|<1.2, where f is an total effective focal length of the imaging lens assembly, R9 is a radius of curvature of an object-side surface of the fifth lens, and R10 is a radius of curvature of an image-side surface of the fifth lens. More specifically, f, R9 and R10 may further satisfy 0<|f/R9|+|f/R10|<1.2, for example, 0.30≤|f/R9|+|f/R10|≤1.13. By properly setting the radius of curvature of the fifth lens to make its curved surface smooth, the total focal length of the lens assembly can be effectively increased. At the same time, by properly assigning the refractive power of the fifth lens, the sensitivity of the processing for actual components is advantageously reduced.

In an exemplary implementation, the imaging lens assembly of the present disclosure may satisfy 0.5≤|f/R11|f/R12|<1.5, where f is an total effective focal length of the imaging lens assembly, R11 is a radius of curvature of an object-side surface of the sixth lens, and R12 is a radius of curvature of an image-side surface of the sixth lens. More specifically, f, R11 and R12 may further satisfy 0.50≤|f/R11|+|f/R12|≤1.36. By properly setting the radius of curvature of the sixth lens, the angle of the incident light and the angle of the emergent light for the sixth lens are advantageously adjusted, and the chief ray angle (CRA) of the optical system can be effectively controlled, which is more beneficial to the matching with the chips.

In an exemplary implementation, the imaging lens assembly of the present disclosure may satisfy f/EPD<2.5, where f is a total effective focal length of the imaging lens assembly, and EPD is an entrance pupil diameter of the imaging lens assembly. More specifically, f and EPD may further satisfy 2.18≤f/EPD≤2.48. When the formula f/EPD<2.5 is satisfied, the system has the advantage of a large aperture, which can enhance the imaging effect of the system in a weak light environment, while reducing the aberrations at the edge field-of-view.

In an exemplary implementation, the imaging lens assembly may further include at least one stop to improve the imaging quality of the imaging lens assembly. The stop may be disposed at any positions as needed, for example, the stop may be disposed between the object side and the first lens.

Alternatively, the imaging lens assembly described above may further include an optical filter for correcting chromatic aberration and/or a protective glass for protecting a photo-sensitive element on the imaging plane.

The present disclosure provides a long-focus lens assembly with six lens, this long-focus lens assembly can be used with other known wide-angle lens assemblies to form a dual-camera lens assembly, so as to achieve an ideal magnification and a good quality image under auto-focus. In addition, by properly disposing the refractive power, the surface shape, the center thickness of each lens, and spaced distances along the optical axis between the lenses, the size and the sensitivity of the long-focus lens assembly of the present disclosure can be effectively reduced, and the processability of the long-focus lens assembly can be improved, such that the long-focus lens assembly is more advantageous for production processing and can be applied to portable electronic products. Meanwhile, the long-focus lens assembly configured as described above may also have smaller aberrations and can match with high-resolution imaging chips.

In the implementations of the present disclosure, most of the lenses employ aspheric surface. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. With aspheric lens, the aberrations that occur during imaging can be eliminated as much as possible, and thus improving imaging quality.

However, it will be understood by those skilled in the art that the number of lenses constituting the imaging lens assembly can be varied to achieve the various results and advantages described in this specification without departing from the technical solution claimed by the present disclosure. For example, although the implementation are described by taking six lenses as an example, the imaging lens assembly is not limited to including six lenses. The imaging lens assembly can also include other numbers of lenses if desired.

Specific embodiments applicable to the imaging lens assembly of the above implementations will be further described below with reference to the accompanying drawings.

Embodiment 1

An imaging lens assembly according to embodiment 1 of the present disclosure is described below with reference to FIG. 1 to FIG. 2C. FIG. 1 is a schematic structural view of an imaging lens assembly according to embodiment 1 of the present disclosure.

As shown in FIG. 1, the imaging lens assembly according to an example implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a convex surface, and an image-side surface S10 thereof is a concave surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the imaging plane S15.

Table 1 shows the surface type, radius of curvature, thickness, material and conic coefficient of each lens of the imaging lens assembly in embodiment 1, wherein the units for the radius of curvature and the thickness are millimeter (mm).

TABLE 1

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.6412 | | | |
| S1 | aspheric | 1.5469 | 1.1049 | 1.55 | 56.1 | −0.3106 |
| S2 | aspheric | −10.9451 | 0.1066 | | | 24.5266 |
| S3 | aspheric | −8.0874 | 0.2432 | 1.67 | 20.4 | −36.7076 |
| S4 | aspheric | 3.9030 | 0.5928 | | | −61.2488 |
| S5 | aspheric | −6.0147 | 0.3201 | 1.67 | 20.4 | −27.0097 |
| S6 | aspheric | −2.4694 | 0.0757 | | | −54.5070 |
| S7 | aspheric | −5.0506 | 0.2477 | 1.55 | 56.1 | −32.4684 |
| S8 | aspheric | 4.6610 | 0.4288 | | | −25.6239 |
| S9 | aspheric | 114.2101 | 0.3000 | 1.55 | 56.1 | 0.0000 |
| S10 | aspheric | 24.0780 | 0.6000 | | | 0.0000 |
| S11 | aspheric | −9.6056 | 0.4947 | 1.64 | 23.5 | 17.3088 |
| S12 | aspheric | 11.9275 | 0.1668 | | | 0.0028 |
| S13 | spherical | infinite | 0.1100 | 1.52 | 64.2 | |
| S14 | spherical | infinite | 0.6487 | | | |
| S15 | spherical | infinite | | | | |

As can be seen from Table 1, the object-side surface and the image-side surface of any one of the first lens E1 to the sixth lens E6 are aspheric. In this embodiment, the surface shape x of each aspheric lens can be defined by using, but not limited to, the following aspheric formula:

$$x = \frac{ch^2}{1+\sqrt{1-(k+1)c^2h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature in the above Table 1); k is the conic coefficient (given in Table 1); Ai is a correction coefficient for the i-th order of the aspheric surface. Table 2 below shows high-order coefficients A4, A6, A8, A10, A12, A14, A16, A18 and A20 applicable to each aspheric surface S1-S12 in embodiment 1.

TABLE 2

| Surface number | A4 | A6 | A8 | A10 | A12 | A14 | A16 | A18 | A20 |
|---|---|---|---|---|---|---|---|---|---|
| S1 | 1.5439E-02 | -4.6580E-02 | 1.6537E-01 | -3.1232E-01 | 3.5882E-01 | -2.5176E-01 | 1.0482E-01 | -2.3462E-02 | 2.0963E-03 |
| S2 | -1.8791E-02 | 2.4666E-01 | -8.7032E-01 | 1.9542E+00 | -2.8276E+00 | 2.5942E+00 | -1.4553E+00 | 4.5454E-01 | -6.0394E-02 |
| S3 | -8.8572E-02 | 3.7096E-01 | -9.7792E-01 | 1.8506E+00 | -2.4178E+00 | 2.0979E+00 | -1.1477E+00 | 3.5780E-01 | -4.8254E-02 |
| S4 | 4.8846E-02 | -7.5035E-02 | 4.3052E-01 | -1.5931E+00 | 3.3468E+00 | -4.2360E+00 | 3.1926E+00 | -1.3246E+00 | 2.3317E-01 |
| S5 | -9.1969E-02 | -2.0701E-01 | 2.0275E+00 | -9.9259E+00 | 2.8507E+01 | -5.2300E+01 | 5.8531E+01 | -3.6172E+01 | 9.4221E+00 |
| S6 | -5.2637E-01 | 2.1206E+00 | -5.8655E+00 | 1.2788E+01 | -2.2593E+01 | 2.8945E+01 | -2.4550E+01 | 1.2319E+01 | -2.7670E+00 |
| S7 | -4.3320E-01 | 1.6902E+00 | -4.3713E+00 | 8.9575E+00 | -1.5817E+01 | 2.1172E+01 | -1.8920E+01 | 9.9382E+00 | -2.3256E+00 |
| S8 | -2.3021E-01 | 5.8546E-01 | -9.9620E-01 | 1.0368E+00 | -3.3200E-01 | -6.4385E-01 | 9.7874E-01 | -5.6227E-01 | 1.2171E-01 |
| S9 | 5.6197E-03 | -2.9513E-02 | 7.8240E-02 | -1.2260E-01 | 1.2160E-01 | -7.6600E-02 | 2.9746E-02 | -6.5137E-03 | 6.1824E-04 |
| S10 | -2.3724E-03 | 4.5886E-03 | -1.1967E-02 | 2.3638E-02 | -2.8453E-02 | 2.0039E-02 | -8.1271E-03 | 1.7536E-03 | -1.5537E-04 |
| S11 | -1.0798E-01 | 3.9550E-02 | 9.2166E-03 | -1.2054E-02 | -9.7333E-04 | 4.4466E-03 | -1.8910E-03 | 3.3036E-04 | -2.1511E-05 |
| S12 | -1.4826E-01 | 1.2615E-01 | -1.3114E-01 | 1.0865E-01 | -6.1376E-02 | 2.2262E-02 | -4.9650E-03 | 6.2012E-04 | -3.3122E-05 |

Table 3 shows effective focal lengths f1 to f6 of respective lens, a total effective focal length f of the imaging lens assembly, a distance TTL along the optical axis from a center of the object-side surface S1 of the first lens E1 to the imaging plane S15, and half of a maximal field-of-view HFOV of the imaging lens assembly in embodiment 1.

TABLE 3

| f1 (mm) | 2.56 | f6 (mm) | -8.18 |
|---|---|---|---|
| f2 (mm) | -3.92 | f (mm) | 6.02 |
| f3 (mm) | 6.07 | TTL (mm) | 5.44 |
| f4 (mm) | -4.40 | HFOV (°) | 23.3 |
| f5 (mm) | -55.96 | | |

Figures 2A, 2B:
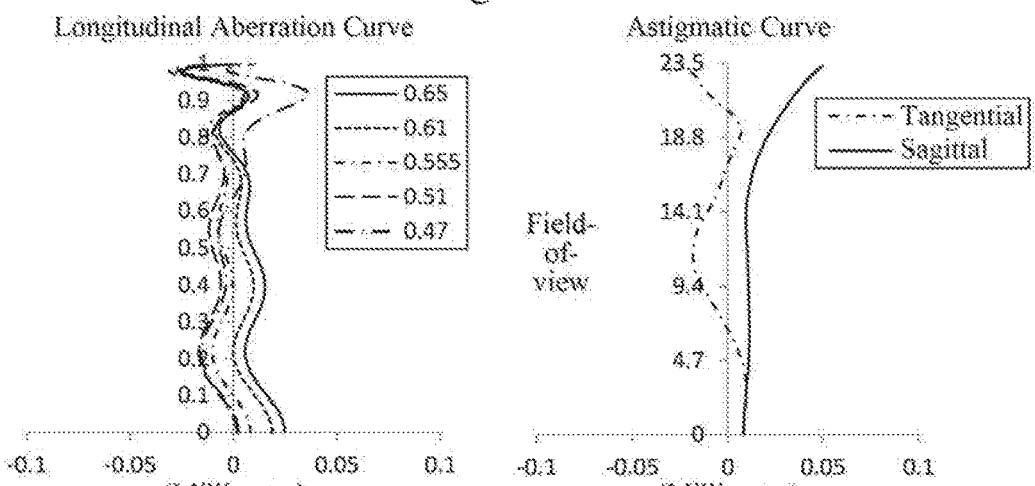
FIGS. 2A to 2C illustrates a longitudinal aberration curve, an astigmatism curve and a distortion curve of the imaging lens assembly according to embodiment 1, respectively.
Figure 2C:
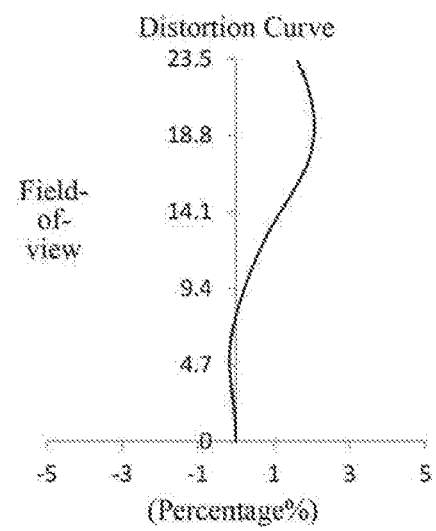

FIG. 2A illustrates a longitudinal aberration curve of the imaging lens assembly according to embodiment 1, representing deviations of focal points converged by light of different wavelengths after passing through the imaging lens assembly. FIG. 2B illustrates an astigmatism curve of the imaging lens assembly according to embodiment 1, representing a curvature of a tangential plane and a curvature of a sagittal plane. FIG. 2C illustrates a distortion curve of the imaging lens assembly according to embodiment 1, representing amounts of distortion corresponding to different FOVs. It can be seen from FIG. 2A to FIG. 2C that the imaging lens assembly provided in embodiment 1 can achieve a good imaging quality.

Embodiment 2

Figure 3:
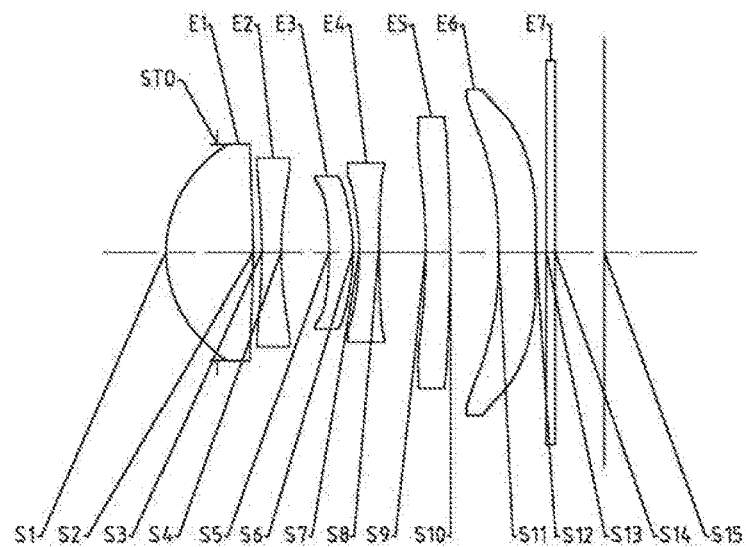
FIG. 3 is a schematic structural view of an imaging lens assembly according to embodiment 2 of the present disclosure.

An imaging lens assembly according to embodiment 2 of the present disclosure is described below with reference to FIG. 3 to FIG. 4C. In this embodiment and the following embodiments, for the purpose of brevity, the description of parts similar to those in embodiment 1 will be omitted. FIG. 3 is a schematic structural view of the imaging lens assembly according to embodiment 2 of the present disclosure.

As shown in FIG. 3, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the imaging plane S15.

Table 4 shows the surface type, radius of curvature, thickness, material and conic coefficient of each lens of the imaging lens assembly in embodiment 2, wherein the units for the radius of curvature and the thickness are millimeter (mm). Table 5 shows high-order coefficients applicable to each aspheric surface in embodiment 2, wherein the surface shape of each aspheric surface can be defined by the formula (1) given in the above embodiment 1. Table 6 shows effective focal lengths f1 to f6 of respective lens, a total effective focal length f of the imaging lens assembly, a distance TTL along the optical axis from the center of the object-side surface S1 of the first lens E1 to the imaging plane S15, and half of a maximal field-of-view HFOV of the imaging lens assembly in embodiment 2.

TABLE 4

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | -0.6412 | | | |
| S1 | aspheric | 1.5368 | 1.0871 | 1.55 | 56.1 | -0.3040 |
| S2 | aspheric | -11.2356 | 0.1076 | | | 25.4024 |
| S3 | aspheric | -8.2765 | 0.2400 | 1.67 | 20.4 | -35.5001 |
| S4 | aspheric | 3.9769 | 0.5970 | | | -64.0260 |
| S5 | aspheric | -5.7045 | 0.2960 | 1.67 | 20.4 | -19.2518 |
| S6 | aspheric | -2.6652 | 0.0786 | | | -62.7484 |
| S7 | aspheric | -4.8303 | 0.2400 | 1.55 | 56.1 | -45.5150 |
| S8 | aspheric | 5.6600 | 0.5790 | | | -12.7930 |
| S9 | aspheric | -8.8990 | 0.3000 | 1.55 | 56.1 | 0.0000 |
| S10 | aspheric | -16.7028 | 0.6000 | | | 0.0000 |
| S11 | aspheric | -11.6636 | 0.4652 | 1.64 | 23.5 | 19.0468 |
| S12 | aspheric | 27.1515 | 0.1288 | | | 0.0000 |
| S13 | spherical | infinite | 0.1100 | 1.52 | 64.2 | |
| S14 | spherical | infinite | 0.6106 | | | |
| S15 | spherical | infinite | | | | |

TABLE 5

| Surface number | A4 | A6 | A8 | A10 | A12 | A14 | A16 | A18 | A20 |
|---|---|---|---|---|---|---|---|---|---|
| S1 | 1.1910E−02 | −1.9925E−02 | 7.0712E−02 | −1.1617E−01 | 1.1196E−01 | −5.9578E−02 | 1.4304E−02 | 2.9731E−04 | −5.9498E−04 |
| S2 | −1.3916E−02 | 1.7171E−01 | −4.9899E−01 | 1.0291E+00 | −1.4865E+00 | 1.4137E+00 | −8.3380E−01 | 2.7440E−01 | −3.8241E−02 |
| S3 | −9.0432E−02 | 3.2512E−01 | −6.5260E−01 | 9.2961E−01 | −9.8113E−01 | 7.6049E−01 | −4.0874E−01 | 1.3456E−01 | −1.9881E−02 |
| S4 | 3.1968E−02 | 4.2168E−02 | −1.1258E−01 | 9.8104E−02 | 2.6443E−03 | −1.3649E−01 | 1.7892E−01 | −1.0633E−01 | 2.4418E−02 |
| S5 | −1.0635E−01 | −6.6526E−02 | 1.1299E+00 | −5.4815E+00 | 1.3471E+01 | −2.0649E+01 | 1.8756E+01 | −8.9421E+00 | 1.6408E+00 |
| S6 | −5.0251E−01 | 2.0813E+00 | −5.8413E+00 | 1.2679E+01 | −2.1416E+01 | 2.5441E+01 | −2.0041E+01 | 9.6268E+00 | −2.1500E+00 |
| S7 | −4.0055E−01 | 1.3281E+00 | −2.2809E+00 | 9.3103E−01 | 5.2717E+00 | −1.3506E+01 | 1.4749E+01 | −7.7505E+00 | 1.5724E+00 |
| S8 | −2.3633E−01 | 5.8991E−01 | −1.2181E+00 | 2.0887E+00 | −2.4513E+00 | 1.9247E+00 | −1.0235E+00 | 3.5312E−01 | −6.0772E−02 |
| S9 | 1.7685E−03 | −5.4479E−02 | 1.5736E−01 | −3.0930E−01 | 3.8780E−01 | −2.8356E−01 | 1.1757E−01 | −2.5679E−02 | 2.2979E−03 |
| S10 | 1.1095E−02 | −2.9553E−02 | 7.5186E−02 | −1.1446E−01 | 1.0171E−01 | −5.2908E−02 | 1.5716E−02 | −2.4491E−03 | 1.5383E−04 |
| S11 | −9.9186E−02 | 5.3496E−02 | 6.0430E−03 | −2.5389E−02 | 1.8098E−02 | −7.6658E−03 | 2.0169E−03 | −2.9311E−04 | 1.7673E−05 |
| S12 | −1.2973E−01 | 8.2016E−02 | −5.7902E−02 | 4.0898E−02 | −2.2677E−02 | 8.4702E−03 | −1.9932E−03 | 2.6500E−04 | −1.4961E−05 |

TABLE 6

| f1 (mm) | 2.55 | f6 (mm) | −12.60 |
|---|---|---|---|
| f2 (mm) | −4.00 | f (mm) | 5.98 |
| f3 (mm) | 7.23 | TTL (mm) | 5.44 |
| f4 (mm) | −4.74 | HFOV (°) | 23.4 |
| f5 (mm) | −35.37 | | |

Figures 4A, 4B:
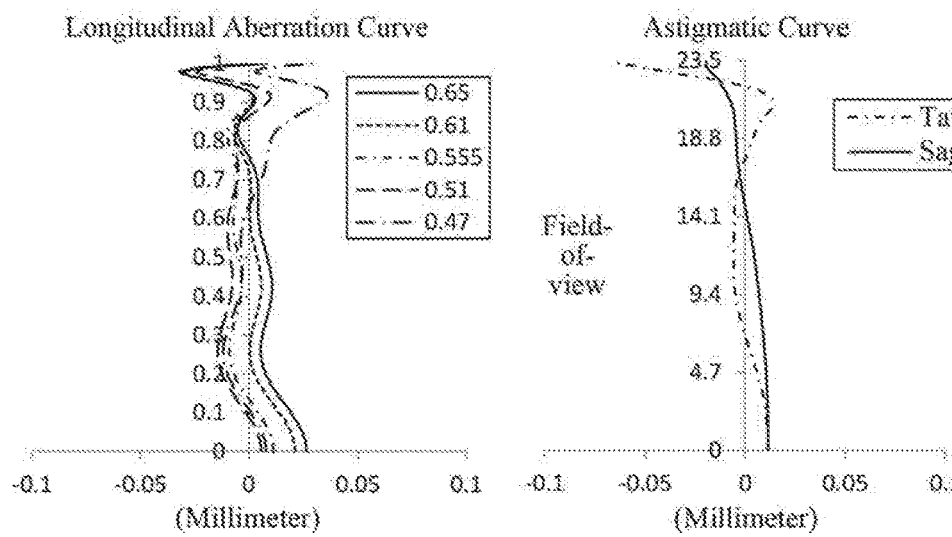
FIGS. 4A to 4C illustrates a longitudinal aberration curve, an astigmatism curve and a distortion curve of the imaging lens assembly according to embodiment 2, respectively.
Figure 4C:
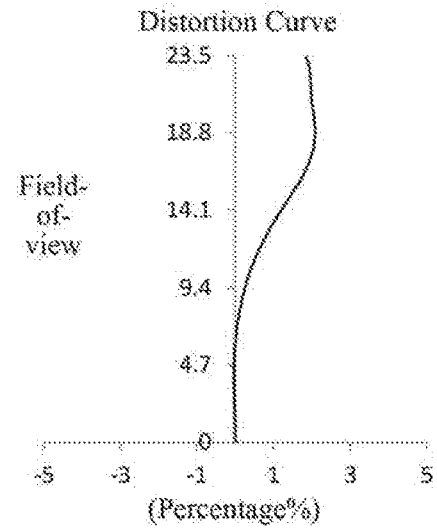

FIG. 4A illustrates a longitudinal aberration curve of the imaging lens assembly according to embodiment 2, representing deviations of focal points converged by light of different wavelengths after passing through the imaging lens assembly. FIG. 4B illustrates an astigmatism curve of the imaging lens assembly according to embodiment 2, representing a curvature of a tangential plane and a curvature of a sagittal plane. FIG. 4C illustrates a distortion curve of the imaging lens assembly according to embodiment 2, representing amounts of distortion corresponding to different FOVs. It can be seen from FIG. 4A to FIG. 4C that the imaging lens assembly provided in embodiment 2 can achieve a good imaging quality.

Embodiment 3

Figure 5:
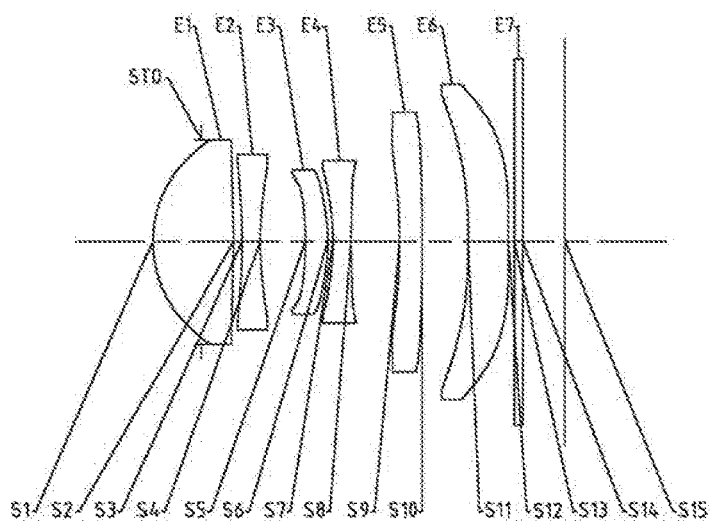
FIG. 5 is a schematic structural view of an imaging lens assembly according to embodiment 3 of the present disclosure.

An imaging lens assembly according to embodiment 3 of the present disclosure is described below with reference to FIG. 5 to FIG. 6C. FIG. 5 is a schematic structural view of the imaging lens assembly according to embodiment 3 of the present disclosure.

As shown in FIG. 5, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the imaging plane S15.

Table 7 shows the surface type, radius of curvature, thickness, material and conic coefficient of each lens of the imaging lens assembly in embodiment 3, wherein the units for the radius of curvature and the thickness are millimeter (mm). Table 8 shows high-order coefficients applicable to each aspheric surface in embodiment 3, wherein the surface shape of each aspheric surface can be defined by the formula (1) given in the above embodiment 1. Table 9 shows effective focal lengths f1 to f6 of respective lens, a total effective focal length f of the imaging lens assembly, a distance TTL along the optical axis from a center of the object-side surface S1 of the first lens E1 to the imaging plane S15, and half of a maximal field-of-view HFOV of the imaging lens assembly in embodiment 3.

TABLE 7

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.6412 | | | |
| S1 | aspheric | 1.5283 | 1.0681 | 1.55 | 56.1 | −0.2981 |
| S2 | aspheric | −12.3549 | 0.1120 | | | 22.9545 |
| S3 | aspheric | −9.0790 | 0.2400 | 1.67 | 19.4 | −38.1968 |
| S4 | aspheric | 4.0046 | 0.5973 | | | −71.3489 |
| S5 | aspheric | −5.5409 | 0.2984 | 1.67 | 20.4 | −16.9676 |
| S6 | aspheric | −2.4412 | 0.0675 | | | −61.4414 |
| S7 | aspheric | −4.1310 | 0.2400 | 1.55 | 56.1 | −50.2106 |
| S8 | aspheric | 5.7900 | 0.6346 | | | −8.3700 |
| S9 | aspheric | −8.0617 | 0.3000 | 1.55 | 56.1 | 0.0000 |
| S10 | aspheric | −26.2134 | 0.6000 | | | 0.0000 |
| S11 | aspheric | −14.8864 | 0.5315 | 1.64 | 23.5 | 22.8619 |
| S12 | aspheric | 21.2607 | 0.0794 | | | 0.0000 |
| S13 | spherical | infinite | 0.1100 | 1.52 | 64.2 | |
| S14 | spherical | infinite | 0.5612 | | | |
| S15 | spherical | infinite | | | | |

TABLE 8

| Surface number | A4 | A6 | A8 | A10 | A12 | A14 | A16 | A18 | A20 |
|---|---|---|---|---|---|---|---|---|---|
| S1 | 1.3156E−02 | −3.0513E−02 | 1.1994E−01 | −2.4014E−01 | 2.9856E−01 | −2.3084E−01 | 1.0827E−01 | −2.7966E−02 | 2.9761E−03 |
| S2 | −1.8721E−02 | 1.9305E−01 | −5.2322E−01 | 1.0059E+00 | −1.3672E+00 | 1.2380E+00 | −7.0491E−01 | 2.2700E−01 | −3.1299E−02 |
| S3 | −1.0565E−01 | 4.0736E−01 | −9.0874E−01 | 1.4822E+00 | −1.7708E+00 | 1.4718E+00 | −7.9313E−01 | 2.4803E−01 | −3.3947E−02 |
| S4 | 2.3910E−02 | 1.2653E−01 | −6.4393E−01 | 2.0020E+00 | −4.1114E+00 | 5.2892E+00 | −4.0873E+00 | 1.7314E+00 | −3.0943E−01 |
| S5 | −1.0046E−01 | 1.3752E−01 | −7.3280E−01 | 3.3430E+00 | −1.3289E+01 | 3.0622E+01 | −4.0858E+01 | 2.9300E+01 | −8.7058E+00 |
| S6 | −5.4676E−01 | 2.7644E+00 | −9.8869E+00 | 2.6600E+01 | −5.2551E+01 | 7.1132E+01 | −6.2124E+01 | 3.1495E+01 | −7.0036E+00 |
| S7 | −3.9620E−01 | 1.4495E+00 | −3.7171E+00 | 6.9914E+00 | −8.7322E+00 | 6.7558E+00 | −3.4169E+00 | 1.3242E+00 | −3.2736E−01 |
| S8 | −2.5631E−01 | 6.2068E−01 | −1.4330E+00 | 3.1195E+00 | −4.7789E+00 | 5.0328E+00 | −3.5280E+00 | 1.4629E+00 | −2.6668E−01 |
| S9 | −5.9204E−03 | −9.8142E−03 | −1.5929E−02 | 3.7005E−02 | −4.9169E−03 | −1.8053E−02 | 1.2235E−02 | −3.1461E−03 | 2.9566E−04 |
| S10 | 6.5417E−03 | 1.7903E−02 | −7.5130E−02 | 1.0760E−01 | −8.5599E−02 | 4.1754E−02 | −1.2515E−02 | 2.1183E−03 | −1.5470E−04 |
| S11 | −8.7509E−02 | 8.5590E−02 | −6.3757E−02 | 3.3695E−02 | −1.0684E−02 | 1.4730E−03 | 8.2041E−05 | −4.5613E−05 | 3.5674E−06 |
| S12 | −1.2897E−01 | 1.0952E−01 | −9.2091E−02 | 5.7805E−02 | −2.5280E−02 | 7.4300E−03 | −1.4000E−03 | 1.5131E−04 | −6.9910E−06 |

TABLE 9

| f1 (mm) | 2.56 | f6 (mm) | −13.51 |
|---|---|---|---|
| f2 (mm) | −4.08 | f (mm) | 5.99 |
| f3 (mm) | 6.31 | TTL (mm) | 5.44 |
| f4 (mm) | −4.38 | HFOV (°) | 23.2 |
| f5 (mm) | −21.45 | | |

Figures 6A, 6B:
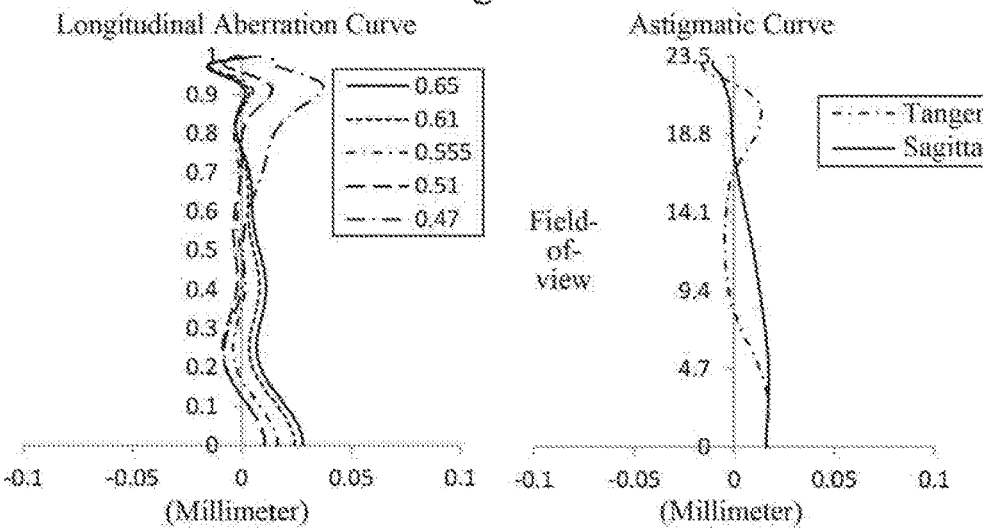
FIGS. 6A to 6C illustrates a longitudinal aberration curve, an astigmatism curve and a distortion curve of the imaging lens assembly according to embodiment 3, respectively.
Figure 6C:
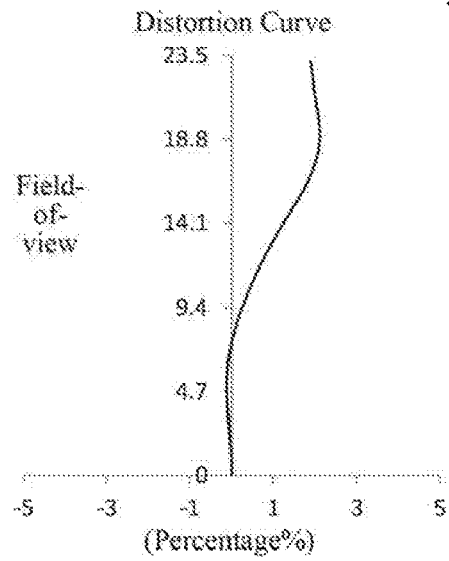

FIG. 6A illustrates a longitudinal aberration curve of the imaging lens assembly according to embodiment 3, representing deviations of focal points converged by light of different wavelengths after passing through the imaging lens assembly. FIG. 6B illustrates an astigmatism curve of the imaging lens assembly according to embodiment 3, representing a curvature of a tangential plane and a curvature of a sagittal plane. FIG. 6C illustrates a distortion curve of the imaging lens assembly according to embodiment 3, representing amounts of distortion corresponding to different FOVs. It can be seen from FIG. 6A to FIG. 6C that the imaging lens assembly provided in embodiment 3 can achieve a good imaging quality.

Embodiment 4

An imaging lens assembly according to embodiment 4 of the present disclosure is described below with reference to FIG. 7 to FIG. 8C. FIG. 7 is a schematic structural view of the imaging lens assembly according to embodiment 4 of the present disclosure.

As shown in FIG. 7, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the imaging plane S15.

Table 10 shows the surface type, radius of curvature, thickness, material and conic coefficient of each lens of the imaging lens assembly in embodiment 4, wherein the units for the radius of curvature and the thickness are millimeter (mm). Table 11 shows high-order coefficients applicable to each aspheric surface in embodiment 4, wherein the surface shape of each aspheric surface can be defined by the formula (1) given in the above embodiment 1. Table 12 shows effective focal lengths f1 to f6 of respective lens, a total effective focal length f of the imaging lens assembly, a distance TTL along the optical axis from a center of the object-side surface S1 of the first lens E1 to the imaging plane S15, and half of a maximal field-of-view HFOV of the imaging lens assembly in embodiment 4.

TABLE 10

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.6412 | | | |
| S1 | aspheric | 1.5526 | 1.1387 | 1.55 | 56.1 | −0.3093 |
| S2 | aspheric | −10.9288 | 0.1085 | | | 24.2699 |
| S3 | aspheric | −8.2425 | 0.2407 | 1.67 | 20.4 | −38.4612 |
| S4 | aspheric | 4.0571 | 0.5989 | | | −67.8800 |
| S5 | aspheric | −5.5567 | 0.2880 | 1.67 | 20.4 | −17.8578 |
| S6 | aspheric | −2.5967 | 0.0673 | | | −68.0373 |
| S7 | aspheric | −4.5855 | 0.2400 | 1.55 | 56.1 | −61.3208 |
| S8 | aspheric | 5.9993 | 0.6222 | | | −11.3562 |
| S9 | aspheric | −7.6167 | 0.2939 | 1.55 | 56.1 | 0.0000 |
| S10 | aspheric | −17.2742 | 0.6039 | | | 0.0000 |
| S11 | aspheric | −12.3734 | 0.5148 | 1.64 | 23.5 | 1.4137 |
| S12 | aspheric | 18.5105 | 0.0656 | | | 0.0000 |
| S13 | spherical | infinite | 0.1100 | 1.52 | 64.2 | |
| S14 | spherical | infinite | 0.5474 | | | |
| S15 | spherical | infinite | | | | |

TABLE 11

| Surface number | A4 | A6 | A8 | A10 | A12 | A14 | A16 | A18 | A20 |
|---|---|---|---|---|---|---|---|---|---|
| S1 | 1.2605E-02 | -2.8264E-02 | 1.0008E-01 | -1.8160E-01 | 2.0503E-01 | -1.4440E-01 | 6.1876E-02 | -1.4626E-02 | 1.4107E-03 |
| S2 | -1.8932E-02 | 1.7738E-01 | -4.3269E-01 | 7.4508E-01 | -9.2049E-01 | 7.6689E-01 | -4.0497E-01 | 1.2177E-01 | -1.5773E-02 |
| S3 | -1.0321E-01 | 3.6259E-01 | -6.9812E-01 | 9.3336E-01 | -8.8945E-01 | 5.8968E-01 | -2.5627E-01 | 6.6203E-02 | -7.7527E-03 |
| S4 | 1.6332E-02 | 1.4877E-01 | -7.2038E-01 | 2.2319E+00 | -4.5368E+00 | 5.7573E+00 | -4.3654E+00 | 1.8033E+00 | -3.1263E-01 |
| S5 | -1.0978E-01 | 2.7787E-01 | -2.0302E+00 | 9.7798E+00 | -3.2652E+01 | 6.7294E+01 | -8.3197E+01 | 5.6435E+01 | -1.6100E+01 |
| S6 | -5.2142E-01 | 2.6433E+00 | -9.3667E+00 | 2.4395E+01 | -4.5905E+01 | 5.9290E+01 | -5.0081E+01 | 2.4935E+01 | -5.5056E+00 |
| S7 | -4.0341E-01 | 1.5452E+00 | -4.0920E+00 | 7.6572E+00 | -8.8120E+00 | 5.5233E+00 | -1.9024E+00 | 6.6167E-01 | -2.4139E-01 |
| S8 | -2.6119E-01 | 6.4001E-01 | -1.4105E+00 | 2.7404E+00 | -3.5803E+00 | 3.1338E+00 | -1.8753E+00 | 7.0967E-01 | -1.2562E-01 |
| S9 | -3.7498E-03 | -4.9764E-02 | 1.4342E-01 | -2.7263E-01 | 3.3620E-01 | -2.4234E-01 | 9.9212E-02 | -2.1470E-02 | 1.9118E-03 |
| S10 | 1.1265E-02 | -1.4595E-02 | 2.9654E-02 | -5.1314E-02 | 5.0188E-02 | -2.7245E-02 | 8.1482E-03 | -1.2492E-03 | 7.5759E-05 |
| S11 | -8.4475E-02 | 5.4352E-02 | -8.6947E-03 | -1.3379E-02 | 1.2146E-02 | -5.1036E-03 | 1.2002E-03 | -1.4958E-04 | 7.6512E-06 |
| S12 | -1.2829E-01 | 9.2309E-02 | -7.1005E-02 | 4.5744E-02 | -2.1661E-02 | 6.9018E-03 | -1.3861E-03 | 1.5687E-04 | -7.4980E-06 |

TABLE 12

| f1 (mm) | 2.57 | f6 (mm) | -11.43 |
|---|---|---|---|
| f2 (mm) | -4.05 | f (mm) | 5.98 |
| f3 (mm) | 7.04 | TTL (mm) | 5.44 |
| f4 (mm) | -4.72 | HFOV (°) | 23.4 |
| f5 (mm) | -25.23 | | |

FIG. 8A illustrates a longitudinal aberration curve of the imaging lens assembly according to embodiment 4, representing deviations of focal points converged by light of different wavelengths after passing through the imaging lens assembly. FIG. 8B illustrates an astigmatism curve of the imaging lens assembly according to embodiment 4, representing a curvature of a tangential plane and a curvature of a sagittal plane. FIG. 8C illustrates a distortion curve of the imaging lens assembly according to embodiment 4, representing amounts of distortion corresponding to different FOVs. It can be seen from FIG. 8A to FIG. 8C that the imaging lens assembly provided in embodiment 4 can achieve a good imaging quality.

Embodiment 5

Figure 9:
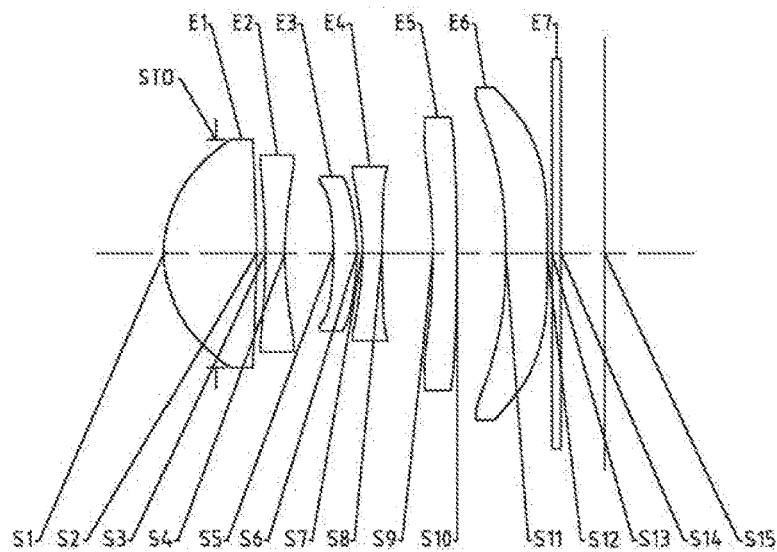
FIG. 9 is a schematic structural view of an imaging lens assembly according to embodiment 5 of the present disclosure.

An imaging lens assembly according to embodiment 5 of the present disclosure is described below with reference to FIG. 9 to FIG. 10C. FIG. 9 is a schematic structural view of the imaging lens assembly according to embodiment 5 of the present disclosure.

As shown in FIG. 9, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the imaging plane S15.

Table 13 shows the surface type, radius of curvature, thickness, material and conic coefficient of each lens of the imaging lens assembly in embodiment 5, wherein the units for the radius of curvature and the thickness are millimeter (mm). Table 14 shows high-order coefficients applicable to each aspheric surface in embodiment 5, wherein the surface shape of each aspheric surface can be defined by the formula (1) given in the above embodiment 1. Table 15 shows effective focal lengths f1 to f6 of respective lens, a total effective focal length f of the imaging lens assembly, a distance TTL along the optical axis from the center of the object-side surface S1 of the first lens E1 to the imaging plane S15, and half of a maximal field-of-view HFOV of the imaging lens assembly in embodiment 5.

TABLE 13

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | -0.6412 | | | |
| S1 | aspheric | 1.5531 | 1.1442 | 1.55 | 56.1 | -0.3090 |
| S2 | aspheric | -10.9986 | 0.1104 | | | 24.1380 |
| S3 | aspheric | -8.3527 | 0.2400 | 1.67 | 19.4 | -38.9364 |
| S4 | aspheric | 4.0748 | 0.5984 | | | -68.5657 |
| S5 | aspheric | -5.7170 | 0.2941 | 1.67 | 20.4 | -18.0815 |
| S6 | aspheric | -2.5544 | 0.0667 | | | -66.7440 |
| S7 | aspheric | -4.5801 | 0.2400 | 1.55 | 56.1 | -62.2993 |
| S8 | aspheric | 5.6005 | 0.6264 | | | -11.7040 |
| S9 | aspheric | -8.0695 | 0.2898 | 1.55 | 56.1 | 0.0000 |
| S10 | aspheric | -19.9501 | 0.6051 | | | 0.0000 |
| S11 | aspheric | -11.1327 | 0.5117 | 1.64 | 23.5 | 5.1088 |
| S12 | aspheric | 23.4816 | 0.0607 | | | 0.0000 |
| S13 | spherical | infinite | 0.1100 | 1.52 | 64.2 | |
| S14 | spherical | infinite | 0.5425 | | | |
| S15 | spherical | infinite | | | | |

TABLE 14

| Surface number | A4 | A6 | A8 | A10 | A12 | A14 | A16 | A18 | A20 |
|---|---|---|---|---|---|---|---|---|---|
| S1 | 1.2064E−02 | −2.3066E−02 | 7.5528E−02 | −1.2074E−01 | 1.1723E−01 | −6.8011E−02 | 2.2406E−02 | −3.4885E−03 | 9.2461E−05 |
| S2 | −1.8586E−02 | 1.7122E−01 | −4.0224E−01 | 6.7915E−01 | −8.4238E−01 | 7.1215E−01 | −3.8216E−01 | 1.1655E−01 | −1.5278E−02 |
| S3 | −1.0213E−01 | 3.3903E−01 | −5.7088E−01 | 5.9634E−01 | −3.7577E−01 | 1.1601E−01 | 5.8059E−03 | −1.4069E−02 | 2.7139E−03 |
| S4 | 1.7436E−02 | 1.1608E−01 | −5.2045E−01 | 1.6002E+00 | −3.3622E+00 | 4.4298E+00 | −3.4659E+00 | 1.4664E+00 | −2.5880E−01 |
| S5 | −9.9404E−02 | 1.4704E−01 | −9.8730E−01 | 4.4286E+00 | −1.5440E+01 | 3.3019E+01 | −4.2243E+01 | 2.9580E+01 | −8.6886E+00 |
| S6 | −5.2320E−01 | 2.7086E+00 | −9.9999E+00 | 2.7096E+01 | −5.2412E+01 | 6.8873E+01 | −5.8648E+01 | 2.9191E+01 | −6.4039E+00 |
| S7 | −4.0376E−01 | 1.6583E+00 | −5.2381E+00 | 1.2769E+01 | −2.1662E+01 | 2.5110E+01 | −1.9885E+01 | 9.8057E+00 | −2.2167E+00 |
| S8 | −2.6585E−01 | 6.8727E−01 | −1.7255E+00 | 3.9107E+00 | −6.1224E+00 | 6.4944E+00 | −4.5461E+00 | 1.8837E+00 | −3.4487E−01 |
| S9 | −3.6387E−03 | −5.0244E−02 | 1.4338E−01 | −2.7238E−01 | 3.3637E−01 | −2.4255E−01 | 9.9292E−02 | −2.1492E−02 | 1.9156E−03 |
| S10 | 1.0297E−02 | −9.4899E−03 | 1.5875E−02 | −3.1458E−02 | 3.2716E−02 | −1.7649E−02 | 4.9627E−03 | −6.6777E−04 | 3.1063E−05 |
| S11 | −8.8299E−02 | 7.2275E−02 | −3.6305E−02 | 1.0838E−02 | −8.5299E−04 | −8.0173E−04 | 3.4491E−04 | −5.5916E−05 | 3.3106E−06 |
| S12 | −1.3377E−01 | 1.0832E−01 | −9.0773E−02 | 6.0064E−02 | −2.8263E−02 | 8.8736E−03 | −1.7581E−03 | 1.9701E−04 | −9.3570E−06 |

TABLE 15

| f1 (mm) | 2.58 | f6 (mm) | −11.65 |
|---|---|---|---|
| f2 (mm) | −4.02 | f (mm) | 5.99 |
| f3 (mm) | 6.68 | TTL (mm) | 5.44 |
| f4 (mm) | −4.58 | HFOV (°) | 22.4 |
| f5 (mm) | −25.04 | | |

Figure 10A:
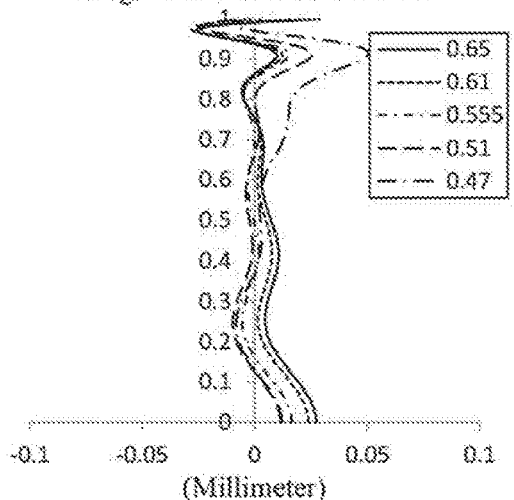
FIGS. 10A to 10C illustrates a longitudinal aberration curve, an astigmatism curve and a distortion curve of the imaging lens assembly according to embodiment 5, respectively.
Figure 10B:
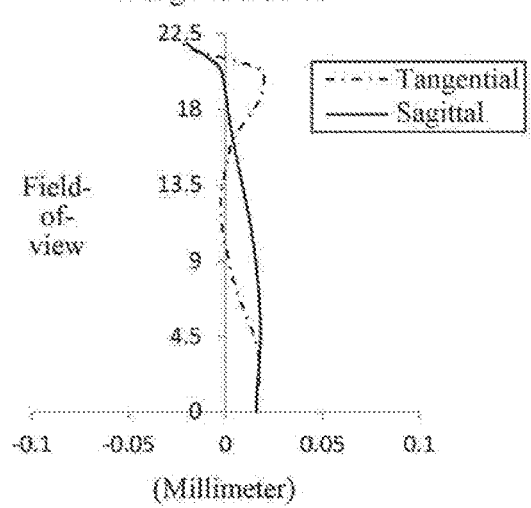
Figure 10C:
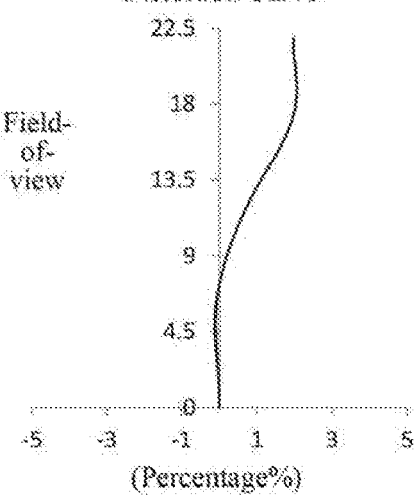

FIG. 10A illustrates a longitudinal aberration curve of the imaging lens assembly according to embodiment 5, representing deviations of focal points converged by light of different wavelengths after passing through the imaging lens assembly. FIG. 10B illustrates an astigmatism curve of the imaging lens assembly according to embodiment 5, representing a curvature of a tangential plane and a curvature of a sagittal plane. FIG. 10C illustrates a distortion curve of the imaging lens assembly according to embodiment 5, representing amounts of distortion corresponding to different FOVs. It can be seen from FIG. 10A to FIG. 10C that the imaging lens assembly provided in embodiment 5 can achieve a good imaging quality.

Embodiment 6

Figure 11:
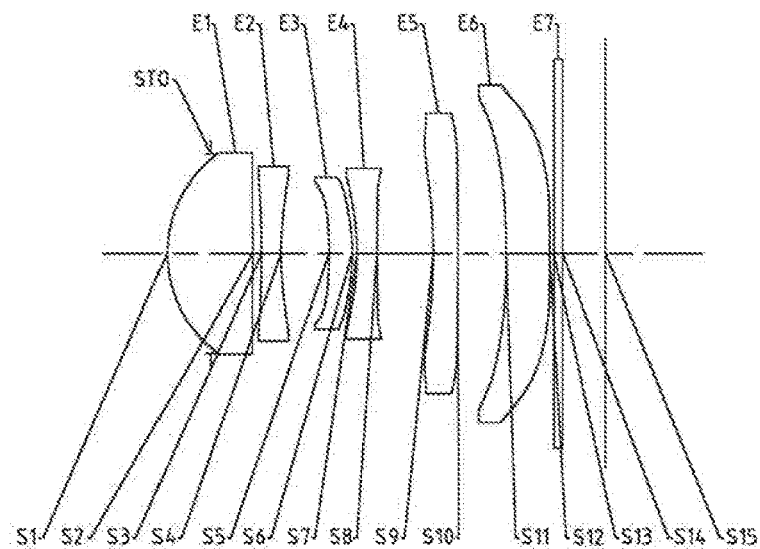
FIG. 11 is a schematic structural view of an imaging lens assembly according to embodiment 6 of the present disclosure.

An imaging lens assembly according to embodiment 6 of the present disclosure is described below with reference to FIG. 11 to FIG. 12C. FIG. 11 is a schematic structural view of the imaging lens assembly according to embodiment 6 of the present disclosure.

As shown in FIG. 11, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the imaging plane S15.

Table 16 shows the surface type, radius of curvature, thickness, material and conic coefficient of each lens of the imaging lens assembly in embodiment 6, wherein the units for the radius of curvature and the thickness are millimeter (mm). Table 17 shows high-order coefficients applicable to each aspheric surface in embodiment 6, wherein the surface shape of each aspheric surface can be defined by the formula (1) given in the above embodiment 1. Table 18 shows effective focal lengths f1 to f6 of respective lens, a total effective focal length f of the imaging lens assembly, a distance TTL along the optical axis from a center of the object-side surface S1 of the first lens E1 to the imaging plane S15, and half of a maximal field-of-view HFOV of the imaging lens assembly in embodiment 6.

TABLE 16

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.5412 | | | |
| S1 | aspheric | 1.5245 | 1.0626 | 1.55 | 56.1 | −0.2977 |
| S2 | aspheric | −20.4960 | 0.1140 | | | 19.9588 |
| S3 | aspheric | −13.0677 | 0.2400 | 1.67 | 19.4 | −48.3042 |
| S4 | aspheric | 3.9204 | 0.5986 | | | −76.1461 |
| S5 | aspheric | −5.4228 | 0.2872 | 1.67 | 20.4 | −12.0244 |
| S6 | aspheric | −2.5107 | 0.0595 | | | −62.1679 |
| S7 | aspheric | −4.0968 | 0.2479 | 1.55 | 56.1 | −45.7201 |
| S8 | aspheric | 6.8412 | 0.6935 | | | −11.8646 |
| S9 | aspheric | −7.7843 | 0.3000 | 1.55 | 56.1 | 0.0000 |
| S10 | aspheric | −82.8259 | 0.6000 | | | 0.0000 |
| S11 | aspheric | −19.9399 | 0.5411 | 1.64 | 23.5 | 60.5913 |
| S12 | aspheric | 22.2627 | 0.0519 | | | 0.0000 |
| S13 | spherical | infinite | 0.1100 | 1.52 | 64.2 | |
| S14 | spherical | infinite | 0.5337 | | | |
| S15 | spherical | infinite | | | | |

TABLE 17

| Surface number | A4 | A6 | A8 | A10 | A12 | A14 | A16 | A18 | A20 |
|---|---|---|---|---|---|---|---|---|---|
| S1 | 1.3055E−02 | −3.2943E−02 | 1.4496E−01 | −3.2166E−01 | 4.3682E−01 | −3.6465E−01 | 1.8254E−01 | −4.9986E−02 | 5.6786E−03 |
| S2 | −2.0428E−02 | 2.1821E−01 | −6.0070E−01 | 1.1218E+00 | −1.4405E+00 | 1.2060E+00 | −6.2481E−01 | 1.8220E−01 | −2.2895E−02 |
| S3 | −1.1219E−01 | 4.8105E−01 | −1.2171E+00 | 2.2205E+00 | −2.8851E+00 | 2.5380E+00 | −1.4139E+00 | 4.4868E−01 | −6.1624E−02 |
| S4 | 3.1267E−02 | 7.9267E−02 | −4.4627E−01 | 1.2374E+00 | −2.2387E+00 | 2.5498E+00 | −1.7323E+00 | 6.3509E−01 | −9.6775E−02 |
| S5 | −8.1451E−02 | −8.4300E−02 | 8.8626E−01 | −4.0887E+00 | 7.1463E+00 | −4.2391E+00 | −4.2379E+00 | 7.5290E+00 | −3.0982E+00 |
| S6 | −4.7474E−01 | 2.0060E+00 | −4.9675E+00 | 7.1960E+00 | −6.5286E+00 | 5.0044E+00 | −5.4772E+00 | 4.7663E+00 | −1.6401E+00 |
| S7 | −3.5408E−01 | 7.2764E−01 | 1.2630E+00 | −1.2855E+01 | 3.8809E+01 | −6.2134E+01 | 5.5947E+01 | −2.6816E+01 | 5.3462E+00 |
| S8 | −2.5215E−01 | 4.9666E−01 | −7.6719E−01 | 1.0381E+00 | −6.6055E−01 | 1.7848E−02 | 9.8127E−02 | 3.1389E−02 | −2.8465E−02 |
| S9 | −8.0912E−03 | −6.7920E−03 | −2.1736E−02 | 4.9312E−02 | −2.0538E−02 | −6.4199E−03 | 7.2230E−03 | −2.0015E−03 | 1.8924E−04 |
| S10 | 7.2025E−03 | 1.4388E−02 | −7.2278E−02 | 1.0353E−01 | −8.1075E−02 | 3.8710E−02 | −1.1304E−02 | 1.8531E−03 | −1.3019E−04 |
| S11 | −7.2409E−02 | 7.2369E−02 | −5.4504E−02 | 2.9050E−02 | −9.8617E−03 | 1.9088E−03 | −1.9194E−04 | 9.5762E−06 | −3.0055E−07 |
| S12 | −1.1944E−01 | 1.0355E−01 | −8.9580E−02 | 5.7400E−02 | −2.5398E−02 | 7.5112E−03 | −1.4180E−03 | 1.5295E−04 | −7.0451E−06 |

TABLE 18

| f1 (mm) | 2.64 | f6 (mm) | −16.20 |
|---|---|---|---|
| f2 (mm) | −4.42 | f (mm) | 5.99 |
| f3 (mm) | 6.73 | TTL (mm) | 5.44 |
| f4 (mm) | −4.65 | HFOV (°) | 23.4 |
| f5 (mm) | −15.74 | | |

Figure 12A:
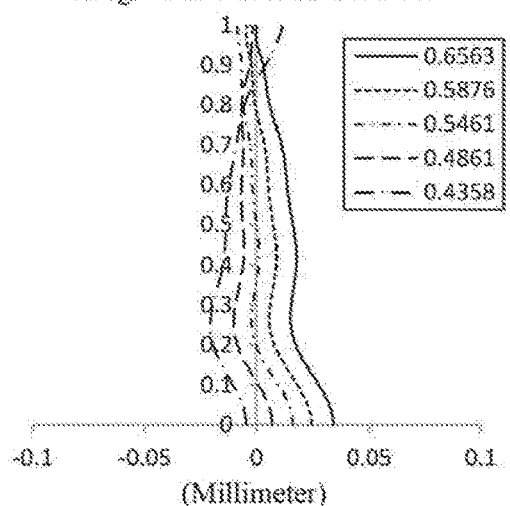
FIGS. 12A to 12C illustrates a longitudinal aberration curve, an astigmatism curve and a distortion curve of the imaging lens assembly according to embodiment 6, respectively.
Figure 12B:
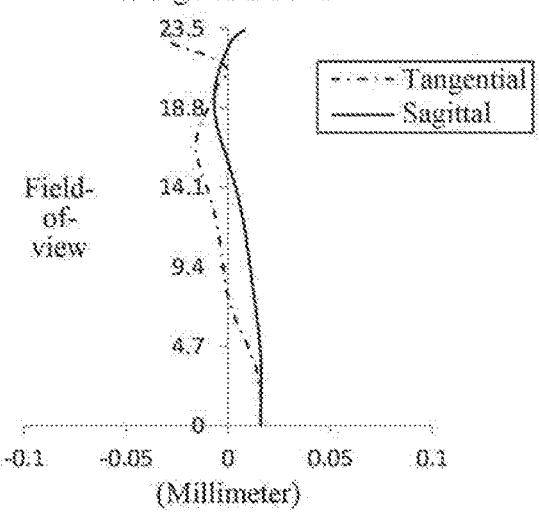
Figure 12C:
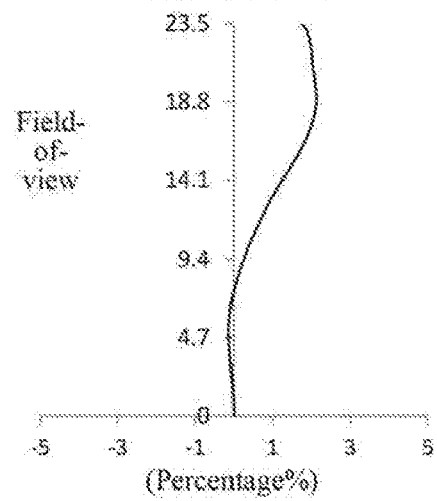

FIG. 12A illustrates a longitudinal aberration curve of the imaging lens assembly according to embodiment 6, representing deviations of focal points converged by light of different wavelengths after passing through the imaging lens assembly. FIG. 12B illustrates an astigmatism curve of the imaging lens assembly according to embodiment 6, representing a curvature of a tangential plane and a curvature of a sagittal plane. FIG. 12C illustrates a distortion curve of the imaging lens assembly according to embodiment 6, representing amounts of distortion corresponding to different FOVs. It can be seen from FIG. 12A to FIG. 12C that the imaging lens assembly provided in embodiment 6 can achieve a good imaging quality.

Embodiment 7

Figure 13:
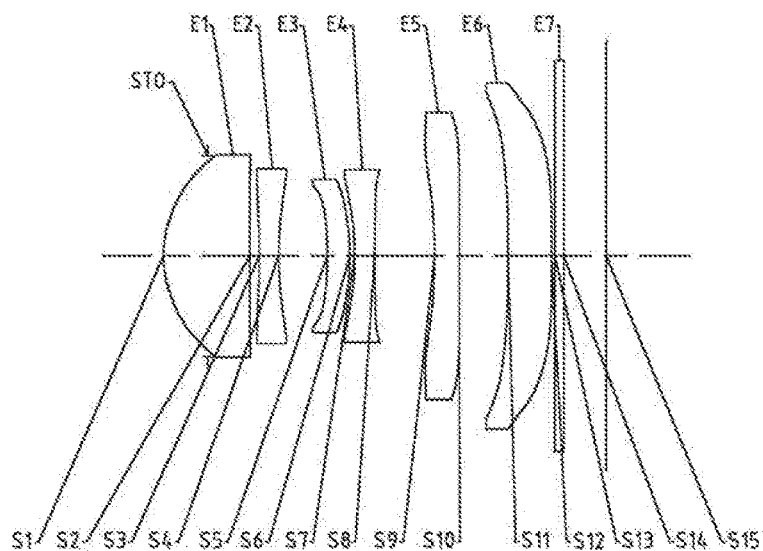
FIG. 13 is a schematic structural view of an imaging lens assembly according to embodiment 7 of the present disclosure.

An imaging lens assembly according to embodiment 7 of the present disclosure is described below with reference to FIG. 13 to FIG. 14C. FIG. 13 is a schematic structural view of the imaging lens assembly according to embodiment 7 of the present disclosure.

As shown in FIG. 13, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a concave surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the imaging plane S15.

Table 19 shows the surface type, radius of curvature, thickness, material and conic coefficient of each lens of the imaging lens assembly in embodiment 7, wherein the units for the radius of curvature and the thickness are millimeter (mm). Table 20 shows high-order coefficients applicable to each aspheric surface in embodiment 7, wherein the surface shape of each aspheric surface can be defined by the formula (1) given in the above embodiment 1. Table 21 shows effective focal lengths f1 to f6 of respective lens, a total effective focal length f of the imaging lens assembly, a distance TTL along the optical axis from a center of the object-side surface S1 of the first lens E1 to the imaging plane S15, and half of a maximal field-of-view HFOV of the imaging lens assembly in embodiment 7.

TABLE 19

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.5412 | | | |
| S1 | aspheric | 1.5237 | 1.0589 | 1.55 | 56.1 | −0.2971 |
| S2 | aspheric | −28.2231 | 0.1149 | | | 45.0311 |
| S3 | aspheric | −15.6636 | 0.2400 | 1.67 | 19.4 | −49.1425 |
| S4 | aspheric | 3.9027 | 0.5986 | | | −75.8084 |
| S5 | aspheric | −5.3627 | 0.2801 | 1.67 | 20.4 | −11.7220 |
| S6 | aspheric | −2.7145 | 0.0595 | | | −64.6233 |
| S7 | aspheric | −4.8484 | 0.2458 | 1.55 | 56.1 | −41.7680 |
| S8 | aspheric | 7.0231 | 0.7309 | | | −10.8776 |
| S9 | aspheric | −7.3808 | 0.3000 | 1.55 | 56.1 | 0.0000 |
| S10 | aspheric | 610.4620 | 0.6000 | | | 0.0000 |
| S11 | aspheric | −445.5291 | 0.5334 | 1.64 | 23.5 | −29.9995 |
| S12 | aspheric | 12.3551 | 0.0430 | | | 0.0000 |
| S13 | spherical | infinite | 0.1100 | 1.52 | 64.2 | |
| S14 | spherical | infinite | 0.5248 | | | |
| S15 | spherical | infinite | | | | |

TABLE 20

| Surface number | A4 | A6 | A8 | A10 | A12 | A14 | A16 | A18 | A20 |
|---|---|---|---|---|---|---|---|---|---|
| S1 | 1.2588E−02 | −2.8891E−02 | 1.2547E−01 | −2.6917E−01 | 3.5358E−01 | −2.8515E−01 | 1.3774E−01 | −3.6309E−02 | 3.9392E−03 |
| S2 | −1.8988E−02 | 1.9259E−01 | −4.7146E−01 | 7.6497E−01 | −8.4575E−01 | 5.9915E−01 | −2.5759E−01 | 6.1899E−02 | −6.5153E−03 |
| S3 | −1.0499E−01 | 4.2638E−01 | −9.7235E−01 | 1.5445E+00 | −1.7196E+00 | 1.2908E+00 | −6.1594E−01 | 1.7106E−01 | −2.1410E−02 |
| S4 | 4.1534E−02 | 4.4455E−03 | −5.4133E−02 | −1.2430E−01 | 7.2954E−01 | −1.4572E+00 | 1.5030E+00 | −7.8901E−01 | 1.6506E−01 |
| S5 | −7.2504E−02 | −1.2370E−01 | 1.2820E+00 | −7.2468E+00 | 1.9616E+01 | −3.1829E+01 | 3.1195E+01 | −1.7187E+01 | 4.1458E+00 |
| S6 | −4.0133E−01 | 1.5357E+00 | −2.9873E+00 | 1.3949E+01 | 1.0817E+01 | −2.1373E+01 | 1.8408E+01 | −7.1176E+00 | 8.6947E−01 |
| S7 | −3.2459E−01 | 4.8365E−01 | 2.3487E+00 | −1.7265E+01 | 5.1045E+01 | −8.2161E+01 | 7.4818E+01 | −3.6386E+01 | 7.3789E+00 |
| S8 | −2.4849E−01 | 4.2053E−01 | −3.7297E−01 | −1.8390E−01 | 1.8599E+00 | −3.2729E+00 | 2.6708E+00 | −1.0665E+00 | 1.6838E−01 |
| S9 | −9.6849E−03 | −5.9005E−03 | −2.2896E−02 | 5.1600E−02 | −2.3536E−02 | −4.1042E−03 | 6.1883E−03 | −1.7573E−03 | 1.6584E−04 |
| S10 | 7.0968E−03 | 1.2535E−02 | −7.1273E−02 | 1.0218E−01 | −7.9456E−02 | 3.7582E−02 | −1.0847E−02 | 1.7525E−03 | −1.2093E−04 |
| S11 | −7.3752E−02 | 9.2067E−02 | −8.7796E−02 | 5.9610E−02 | −2.7529E−02 | 8.4124E−03 | −1.6563E−03 | 1.9136E−04 | −9.7503E−06 |
| S12 | −1.2544E−01 | 1.2408E−01 | −1.1195E−01 | 7.1521E−02 | −3.0882E−02 | 8.8104E−03 | −1.5935E−03 | 1.6411E−04 | −7.2129E−06 |

TABLE 21

| f1 (mm) | 2.68 | f6 (mm) | −18.60 |
|---|---|---|---|
| f2 (mm) | −4.58 | f (mm) | 5.99 |
| f3 (mm) | 7.89 | TTL (mm) | 5.44 |
| f4 (mm) | −5.21 | HFOV (°) | 22.4 |
| f5 (mm) | −13.34 | | |

Figures 14A, 14B:
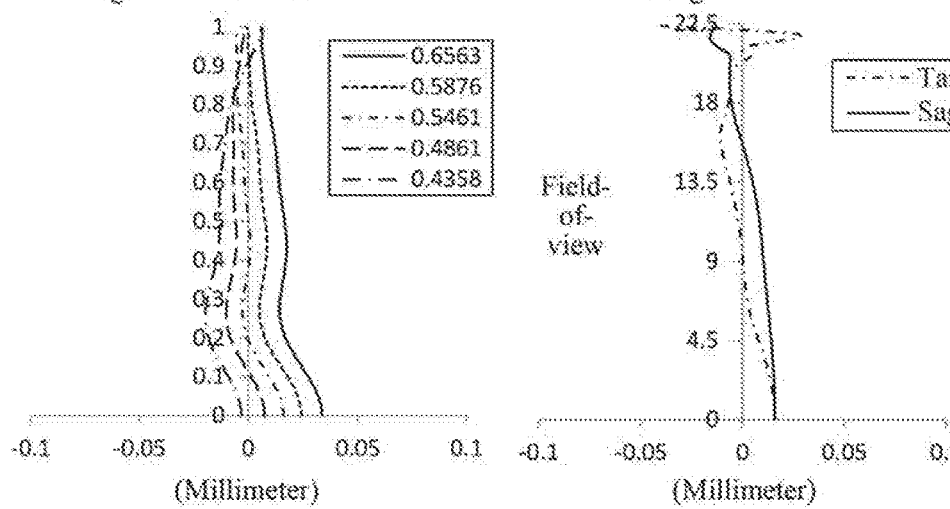
FIGS. 14A to 14C illustrates a longitudinal aberration curve, an astigmatism curve and a distortion curve of the imaging lens assembly according to embodiment 7, respectively.
Figure 14C:
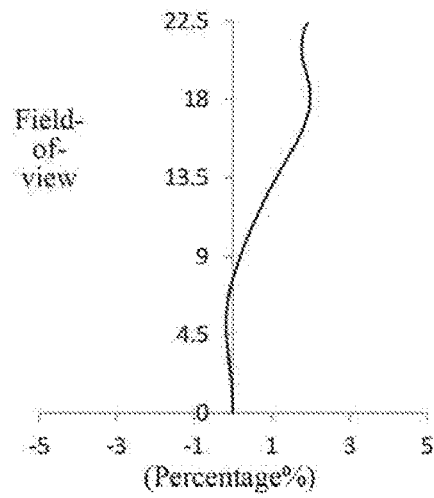

FIG. 14A illustrates a longitudinal aberration curve of the imaging lens assembly according to embodiment 7, representing deviations of focal points converged by light of different wavelengths after passing through the imaging lens assembly. FIG. 14B illustrates an astigmatism curve of the imaging lens assembly according to embodiment 7, representing a curvature of a tangential plane and a curvature of a sagittal plane. FIG. 14C illustrates a distortion curve of the imaging lens assembly according to embodiment 7, representing amounts of distortion corresponding to different FOVs. It can be seen from FIG. 14A to FIG. 14C that the imaging lens assembly provided in embodiment 7 can achieve a good imaging quality.

Embodiment 8

Figure 15:
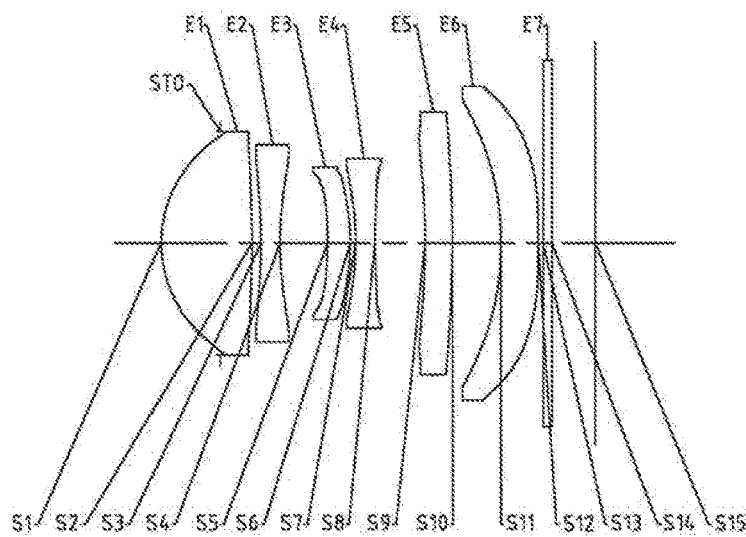
FIG. 15 is a schematic structural view of an imaging lens assembly according to embodiment 8 of the present disclosure.

An imaging lens assembly according to embodiment 8 of the present disclosure is described below with reference to FIG. 15 to FIG. 16C. FIG. 15 is a schematic structural view of the imaging lens assembly according to embodiment 8 of the present disclosure.

As shown in FIG. 15, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a positive refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a convex surface. The optical filter E7 has an object-side surface S13 and an image-side surface S14. Light from the object sequentially passes through the respective surfaces S1 to S14 and is finally imaged on the imaging plane S15.

Table 22 shows the surface type, radius of curvature, thickness, material and conic coefficient of each lens of the imaging lens assembly in embodiment 8, wherein the units for the radius of curvature and the thickness are millimeter (mm). Table 23 shows high-order coefficients applicable to each aspheric surface in embodiment 8, wherein the surface shape of each aspheric surface can be defined by the formula (1) given in the above embodiment 1. Table 24 shows effective focal lengths f1 to f6 of respective lens, a total effective focal length f of the imaging lens assembly, a distance TTL along the optical axis from a center of the object-side surface S1 of the first lens E1 to the imaging plane S15, and half of a maximal field-of-view HFOV of the imaging lens assembly in embodiment 8.

TABLE 22

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.7412 | | | |
| S1 | aspheric | 1.5566 | 1.1419 | 1.55 | 56.1 | −0.3076 |
| S2 | aspheric | −10.8061 | 0.1126 | | | 24.5080 |
| S3 | aspheric | −8.2940 | 0.2400 | 1.67 | 19.4 | −38.6712 |
| S4 | aspheric | 4.1116 | 0.5971 | | | −67.9587 |
| S5 | aspheric | −5.7656 | 0.2872 | 1.67 | 20.4 | −16.7985 |
| S6 | aspheric | −2.6559 | 0.0661 | | | −68.0990 |
| S7 | aspheric | −4.9595 | 0.2400 | 1.55 | 56.1 | −60.9813 |
| S8 | aspheric | 4.9555 | 0.6241 | | | −12.9421 |
| S9 | aspheric | −12.0000 | 0.3373 | 1.55 | 56.1 | 0.0000 |
| S10 | aspheric | −12.0000 | 0.6065 | | | 0.0000 |
| S11 | aspheric | −5.2845 | 0.4700 | 1.64 | 23.5 | 1.3041 |
| S12 | aspheric | −115.5665 | 0.0626 | | | 0.0000 |
| S13 | spherical | infinite | 0.1100 | 1.52 | 64.2 | |
| S14 | spherical | infinite | 0.5444 | | | |
| S15 | spherical | infinite | | | | |

TABLE 23

| Surface number | A4 | A6 | A8 | A10 | A12 | A14 | A16 | A18 | A20 |
|---|---|---|---|---|---|---|---|---|---|
| S1 | 1.2419E−02 | −2.5426E−02 | 8.6914E−02 | −1.5123E−01 | 1.6526E−01 | −1.1389E−01 | 4.8370E−02 | −1.1459E−02 | 1.1124E−03 |
| S2 | −2.0629E−02 | 2.0158E−01 | −5.4275E−01 | 1.0022E+00 | −1.2803E+00 | 1.0825E+00 | −5.7447E−01 | 1.7243E−01 | −2.2198E−02 |
| S3 | −1.0714E−01 | 3.9838E−01 | −8.4214E−01 | 1.2414E+00 | −1.2706E+00 | 8.7336E−01 | −3.8193E−01 | 9.6671E−02 | −1.0846E−02 |
| S4 | 1.0792E−02 | 1.4699E−01 | −5.4354E−01 | 1.3167E+00 | −2.2049E+00 | 2.4067E+00 | −1.6179E+00 | 6.0583E−01 | −9.7729E−02 |
| S5 | −1.0582E−01 | 2.5290E−01 | −1.9124E+00 | 8.9829E+00 | −2.8830E+01 | 5.6874E+01 | −6.7380E+01 | 4.3889E+01 | −1.2037E+01 |
| S6 | −5.1319E−01 | 2.7557E+00 | −1.0954E+01 | 3.2149E+01 | −6.6152E+01 | 9.0322E+01 | −7.8030E+01 | 3.8622E+01 | −8.3164E+00 |
| S7 | −4.1294E−01 | 1.7583E+00 | −6.1191E+00 | 1.6771E+01 | −3.1408E+01 | 3.8480E+01 | −3.0036E+01 | 1.3642E+01 | −2.7356E+00 |
| S8 | −2.5876E−01 | 5.8786E−01 | −1.2378E+00 | 2.5672E+00 | −3.7510E+00 | 3.7196E+00 | −2.4550E+00 | 9.6794E−01 | −1.6916E−01 |
| S9 | −1.0522E−02 | −2.7876E−03 | −4.0873E−03 | −1.8313E−02 | 7.2069E−02 | −7.3556E−02 | 3.4408E−02 | −7.7817E−03 | 6.9258E−04 |
| S10 | 1.3108E−02 | −1.1331E−02 | 2.2721E−02 | −4.3029E−02 | 4.4684E−02 | −2.5148E−02 | 7.7913E−03 | −1.2692E−03 | 8.7127E−05 |
| S11 | −8.1952E−02 | 4.7550E−02 | 7.6394E−03 | −2.2892E−02 | 1.2214E−02 | −3.2717E−03 | 4.8221E−04 | −3.6277E−05 | 1.0239E−06 |
| S12 | −1.3006E−01 | 1.0260E−01 | −9.0104E−02 | 6.7683E−02 | −3.5811E−02 | 1.2129E−02 | −2.5007E−03 | 2.8481E−04 | −1.3579E−05 |

TABLE 24

| f1 (mm) | 2.58 | f6 (mm) | −8.62 |
|---|---|---|---|
| f2 (mm) | −4.03 | f (mm) | 5.99 |
| f3 (mm) | 7.13 | TTL (mm) | 5.44 |
| f4 (mm) | −4.50 | HFOV (°) | 22.4 |
| f5 (mm) | 2214.4 | | |

Figures 16A, 16B:
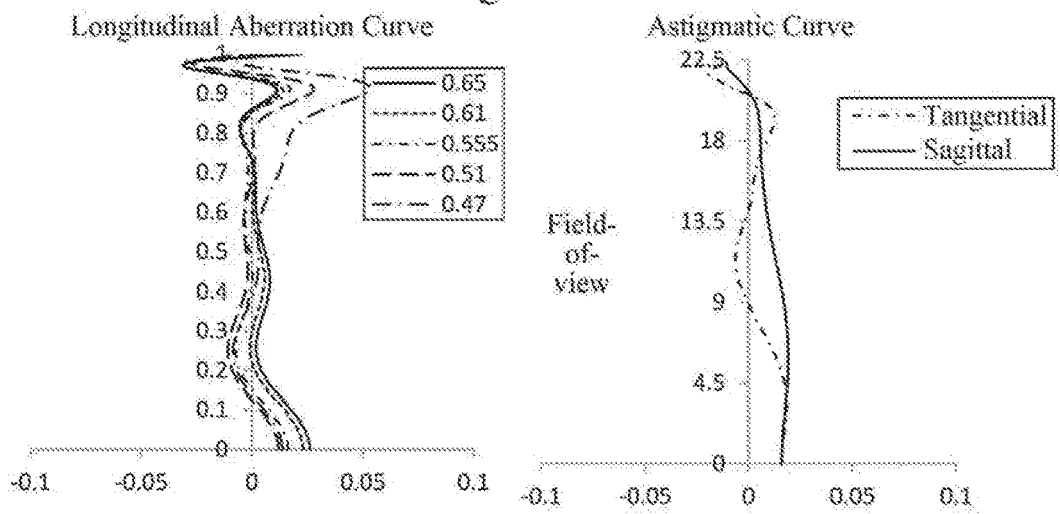
FIGS. 16A to 16C illustrates a longitudinal aberration curve, an astigmatism curve and a distortion curve of the imaging lens assembly according to embodiment 8, respectively.
Figure 16C:
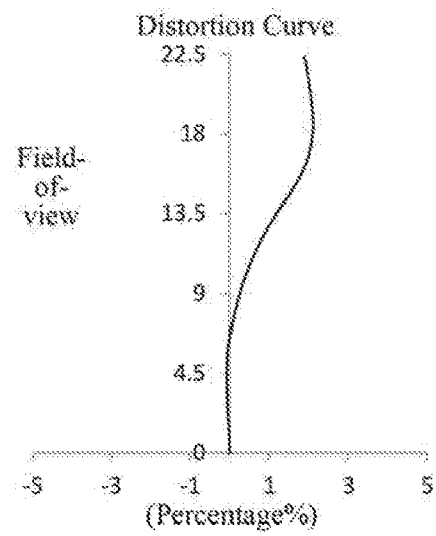

FIG. 16A illustrates a longitudinal aberration curve of the imaging lens assembly according to embodiment 8, representing deviations of focal points converged by light of different wavelengths after passing through the imaging lens assembly. FIG. 16B illustrates an astigmatism curve of the imaging lens assembly according to embodiment 8, representing a curvature of a tangential plane and a curvature of a sagittal plane. FIG. 16C illustrates a distortion curve of the imaging lens assembly according to embodiment 8, representing amounts of distortion corresponding to different FOVs. It can be seen from FIG. 16A to FIG. 16C that the imaging lens assembly provided in embodiment 8 can achieve a good imaging quality.

Embodiment 9

Figure 17:
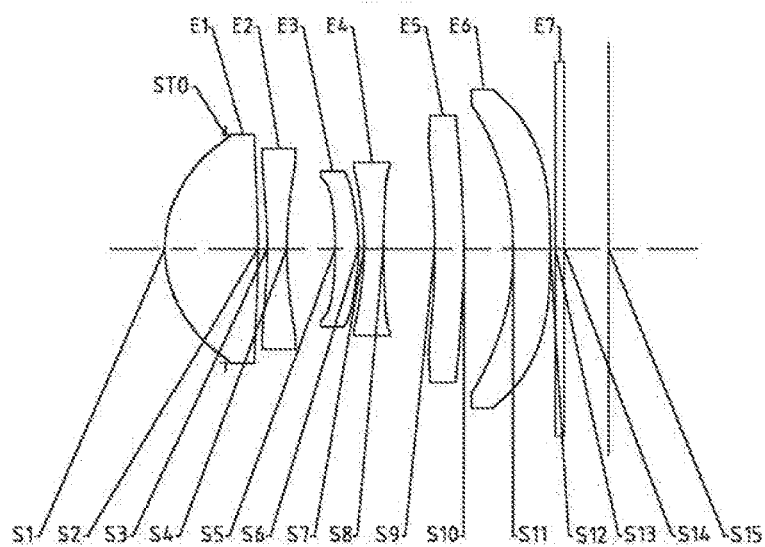
FIG. 17 is a schematic structural view of an imaging lens assembly according to embodiment 9 of the present disclosure.

An imaging lens assembly according to embodiment 9 of the present disclosure is described below with reference to FIG. 17 to FIG. 18C. FIG. 17 is a schematic structural view of the imaging lens assembly according to embodiment 9 of the present disclosure.

As shown in FIG. 17, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a positive refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a convex surface. The optical filter E7 has an object-side surface S13 and an image-side surface S14. Light from the object sequentially passes through the respective surfaces S1 to S14 and is finally imaged on the imaging plane S15.

Table 25 shows the surface type, radius of curvature, thickness, material and conic coefficient of each lens of the imaging lens assembly in embodiment 9, wherein the units for the radius of curvature and the thickness are millimeter (mm). Table 26 shows high-order coefficients applicable to each aspheric surface in embodiment 9, wherein the surface shape of each aspheric surface can be defined by the formula (1) given in the above embodiment 1. Table 27 shows effective focal lengths f1 to f6 of respective lens, a total effective focal length f of the imaging lens assembly, a distance TTL along the optical axis from a center of the object-side surface S1 of the first lens E1 to the imaging plane S15, and half of a maximal field-of-view HFOV of the imaging lens assembly in embodiment 9.

TABLE 25

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.7412 | | | |
| S1 | aspheric | 1.5571 | 1.1413 | 1.55 | 56.1 | −0.3075 |
| S2 | aspheric | −10.7741 | 0.1126 | | | 24.5365 |
| S3 | aspheric | −8.2795 | 0.2400 | 1.67 | 19.4 | −38.6700 |
| S4 | aspheric | 4.1135 | 0.5969 | | | −67.9124 |
| S5 | aspheric | −5.7635 | 0.2868 | 1.67 | 20.4 | −16.5784 |
| S6 | aspheric | −2.6692 | 0.0662 | | | −68.2916 |
| S7 | aspheric | −4.9761 | 0.2400 | 1.55 | 56.1 | −60.9896 |
| S8 | aspheric | 4.9408 | 0.6234 | | | −13.4734 |
| S9 | aspheric | −12.0000 | 0.3516 | 1.55 | 56.1 | 0.0000 |
| S10 | aspheric | −10.0000 | 0.6056 | | | 0.0000 |
| S11 | aspheric | −4.7234 | 0.4556 | 1.64 | 23.5 | 1.0399 |
| S12 | aspheric | −63.7579 | 0.0641 | | | 0.0000 |
| S13 | spherical | infinite | 0.1100 | 1.52 | 64.2 | |
| S14 | spherical | infinite | 0.5460 | | | |
| S15 | spherical | infinite | | | | |

TABLE 26

| Surface number | A4 | A6 | A8 | A10 | A12 | A14 | A16 | A18 | A20 |
|---|---|---|---|---|---|---|---|---|---|
| S1 | 1.1673E−02 | −1.9748E−02 | 6.5840E−02 | −1.0665E−01 | 1.0841E−01 | −6.9451E−02 | 2.7579E−02 | −6.1194E−03 | 5.3379E−04 |
| S2 | −2.0755E−02 | 2.0302E−01 | −5.4856E−01 | 1.0145E+00 | −1.2966E+00 | 1.0965E+00 | −5.8197E−01 | 1.7468E−01 | −2.2487E−02 |
| S3 | −1.0692E−01 | 3.9744E−01 | −8.4057E−01 | 1.2415E+00 | −1.2748E+00 | 8.8021E−01 | −3.8706E−01 | 9.8573E−02 | −1.1127E−02 |
| S4 | 8.7000E−03 | 1.6831E−01 | −6.5636E−01 | 1.6668E+00 | −2.8669E+00 | 3.1790E+00 | −2.1609E+00 | 8.1650E−01 | −1.3237E−01 |
| S5 | −1.0211E−01 | 2.0479E−01 | −1.6168E+00 | 7.8901E+00 | −2.6264E+01 | 5.3020E+01 | −6.3817E+01 | 4.2060E+01 | −1.1642E+01 |
| S6 | −5.1157E−01 | 2.7447E+00 | −1.0923E+01 | 3.2144E+01 | −6.6327E+01 | 9.0747E+01 | −7.8483E+01 | 3.8857E+01 | −8.3650E+00 |
| S7 | −4.1803E−01 | 1.8160E+00 | −6.4824E+00 | 1.8158E+01 | −3.4677E+01 | 4.3248E+01 | −3.4220E+01 | 1.5661E+01 | −3.1466E+00 |
| S8 | −2.5653E−01 | 5.7565E−01 | −1.2022E+00 | 2.4843E+00 | −3.5990E+00 | 3.5145E+00 | −2.2697E+00 | 8.7046E−01 | −1.4702E−01 |
| S9 | −1.1102E−02 | −1.4686E−03 | −5.7951E−03 | −1.7258E−02 | 7.2029E−02 | −7.4029E−02 | 3.4779E−02 | −7.9082E−03 | 7.0952E−04 |
| S10 | 1.4203E−02 | −1.2835E−02 | 2.5347E−02 | −4.6291E−02 | 4.7611E−02 | −2.6929E−02 | 8.4780E−03 | −1.4198E−03 | 1.0140E−04 |
| S11 | −8.3692E−02 | 4.9367E−02 | 7.2921E−03 | −2.3022E−02 | 1.2127E−02 | −3.1466E−03 | 4.3671E−04 | −2.9222E−05 | 6.1494E−07 |
| S12 | −1.3203E−01 | 1.0462E−01 | −9.2461E−02 | 7.0500E−02 | −3.7857E−02 | 1.2963E−02 | −2.6915E−03 | 3.0773E−04 | −1.4698E−05 |

TABLE 27

| f1 (mm) | 2.58 | f6 (mm) | −7.95 |
|---|---|---|---|
| f2 (mm) | −4.03 | f (mm) | 5.99 |
| f3 (mm) | 7.20 | TTL (mm) | 5.44 |
| f4 (mm) | −4.50 | HFOV (°) | 22.4 |
| f5 (mm) | 103.5 | | |

Figure 18A:
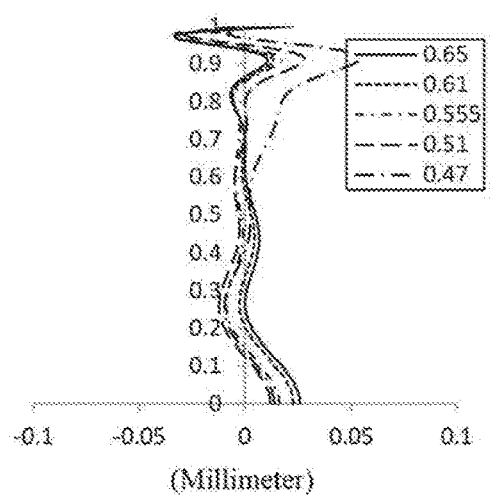
FIGS. 18A to 18C illustrates a longitudinal aberration curve, an astigmatism curve and a distortion curve of the imaging lens assembly according to embodiment 9, respectively.
Figure 18B:
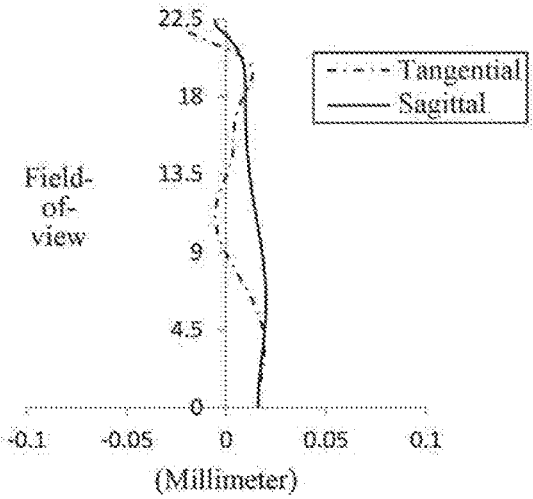
Figure 18C:
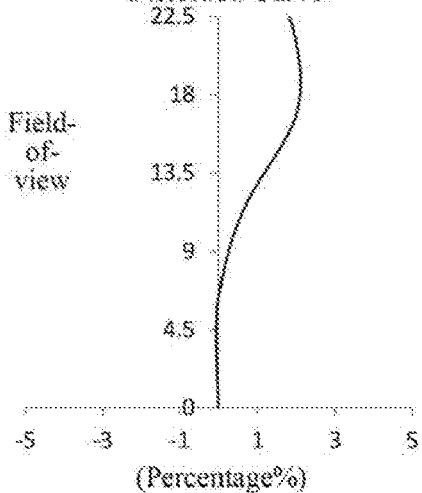

FIG. 18A illustrates a longitudinal aberration curve of the imaging lens assembly according to embodiment 9, representing deviations of focal points converged by light of different wavelengths after passing through the imaging lens assembly. FIG. 18B illustrates an astigmatism curve of the imaging lens assembly according to embodiment 9, representing a curvature of a tangential plane and a curvature of a sagittal plane. FIG. 18C illustrates a distortion curve of the imaging lens assembly according to embodiment 9, representing amounts of distortion corresponding to different FOVs. It can be seen from FIG. 18A to FIG. 18C that the imaging lens assembly provided in embodiment 9 can achieve a good imaging quality.

Embodiment 10

Figure 19:
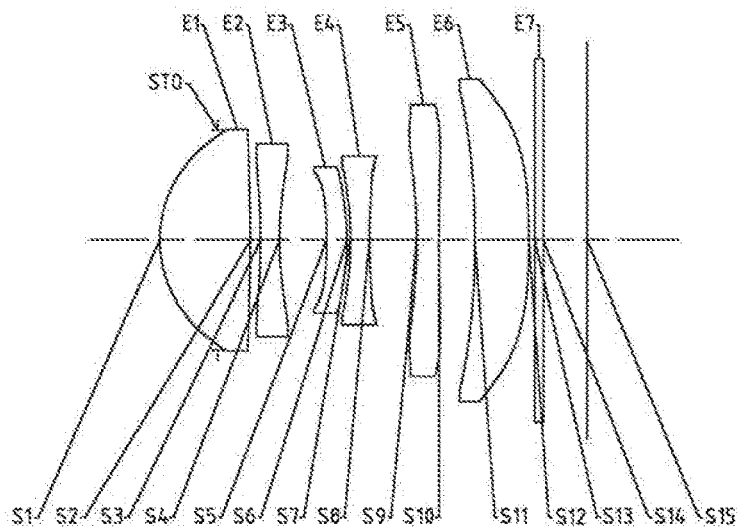
FIG. 19 is a schematic structural view of an imaging lens assembly according to embodiment 10 of the present disclosure.

An imaging lens assembly according to embodiment 10 of the present disclosure is described below with reference to FIG. 19 to FIG. 20C. FIG. 19 is a schematic structural view of the imaging lens assembly according to embodiment 10 of the present disclosure.

As shown in FIG. 19, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a concave surface. The sixth lens E6 has a positive refractive power, and an object-side surface S11 thereof is a concave surface, and an image-side surface S12 thereof is a convex surface. The optical filter E7 has an object-side surface S13 and an image-side surface S14. Light from the object sequentially passes through the respective surfaces S1 to S14 and is finally imaged on the imaging plane S15.

Table 28 shows the surface type, radius of curvature, thickness, material and conic coefficient of each lens of the imaging lens assembly in embodiment 10, wherein the units for the radius of curvature and the thickness are millimeter (mm). Table 29 shows high-order coefficients applicable to each aspheric surface in embodiment 10, wherein the surface shape of each aspheric surface can be defined by the formula (1) given in the above embodiment 1. Table 30 shows effective focal lengths f1 to f6 of respective lens, a total effective focal length f of the imaging lens assembly, a distance TTL along the optical axis from the center of the object-side surface S1 of the first lens E1 to the imaging plane S15, and half of a maximal field-of-view HFOV of the imaging lens assembly in embodiment 10.

TABLE 28

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.7412 | | | |
| S1 | aspheric | 1.5212 | 1.1596 | 1.55 | 56.1 | −0.3052 |
| S2 | aspheric | −12.7766 | 0.1272 | | | 26.3028 |
| S3 | aspheric | −9.6587 | 0.2400 | 1.67 | 19.4 | −38.4252 |
| S4 | aspheric | 3.8402 | 0.6053 | | | −70.0653 |
| S5 | aspheric | −5.7648 | 0.2592 | 1.67 | 20.4 | −10.6269 |
| S6 | aspheric | −2.8484 | 0.0444 | | | −86.2943 |
| S7 | aspheric | −7.1512 | 0.2400 | 1.55 | 56.1 | −55.3499 |
| S8 | aspheric | 4.1871 | 0.5944 | | | −18.9997 |
| S9 | aspheric | −8.7467 | 0.2748 | 1.55 | 56.1 | 0.0000 |
| S10 | aspheric | 21.7583 | 0.4613 | | | 0.0000 |
| S11 | aspheric | −20.0000 | 0.6867 | 1.64 | 23.5 | −6.8572 |
| S12 | aspheric | −20.0000 | 0.0776 | | | 0.0000 |
| S13 | spherical | infinite | 0.1100 | 1.52 | 64.2 | |
| S14 | spherical | infinite | 0.5594 | | | |
| S15 | spherical | infinite | | | | |

TABLE 29

| Surface number | A4 | A6 | A8 | A10 | A12 | A14 | A16 | A18 | A20 |
|---|---|---|---|---|---|---|---|---|---|
| S1 | 1.0527E−02 | −1.6333E−02 | 5.4439E−02 | −8.1174E−02 | 6.6869E−02 | −2.4246E−02 | −2.1786E−03 | 4.4518E−03 | −1.0068E−03 |
| S2 | −1.2643E−02 | 1.3887E−01 | −3.3289E−01 | 5.8318E−01 | −7.2920E−01 | 6.0336E−01 | −3.1012E−01 | 8.8846E−02 | −1.0743E−02 |
| S3 | −1.0965E−01 | 3.7011E−01 | −7.2554E−01 | 1.0948E+00 | −1.2641E+00 | 1.0435E+00 | −5.6393E−01 | 1.7605E−01 | −2.3759E−02 |
| S4 | 2.5637E−02 | 5.3031E−02 | −2.7935E−01 | 1.0160E+00 | −2.4162E+00 | 3.4757E+00 | −2.9485E+00 | 1.3601E+00 | −2.6410E−01 |
| S5 | −7.2133E−02 | −3.1106E−01 | 3.1050E+00 | −1.6650E+01 | 5.0600E+01 | −9.5824E+01 | 1.1019E+02 | −7.0284E+01 | 1.9051E+01 |
| S6 | −4.9001E−01 | 2.4686E+00 | −7.7795E+00 | 1.6959E+01 | −2.5836E+01 | 2.6878E+01 | −1.8845E+01 | 8.2739E+00 | −1.7145E+00 |
| S7 | −4.0068E−01 | 1.4106E+00 | −3.0311E+00 | 2.4259E+00 | 6.6783E+00 | −2.1789E+01 | 2.6681E+01 | −1.5880E+01 | 3.8373E+00 |
| S8 | −2.7273E−01 | 6.5962E−01 | −1.5369E+00 | 3.3663E+00 | −5.1906E+00 | 5.5011E+00 | −3.8897E+00 | 1.6290E+00 | −2.9953E−01 |
| S9 | −6.0115E−03 | −2.8502E−02 | 7.0429E−02 | −1.3782E−01 | 1.9206E−01 | −1.4896E−01 | 6.2881E−02 | −1.3664E−02 | 1.2013E−03 |
| S10 | −2.9974E−02 | 1.0502E−02 | −3.6998E−02 | 4.1937E−02 | −2.9026E−02 | 1.4515E−02 | −5.0739E−03 | 1.0359E−03 | −8.8926E−05 |
| S11 | −4.5121E−02 | 3.5993E−02 | −8.0853E−03 | −6.9853E−03 | 5.9697E−03 | −2.0346E−03 | 3.6591E−04 | −3.4064E−05 | 1.2935E−06 |
| S12 | −7.6919E−02 | 4.3076E−02 | −2.5229E−02 | 1.3551E−02 | −6.0811E−03 | 1.8964E−03 | −3.7068E−04 | 4.0688E−05 | −1.8775E−06 |

TABLE 30

| | | | |
|---|---|---|---|
| f1 (mm) | 2.56 | f6 (mm) | 2311.9 |
| f2 (mm) | −4.03 | f (mm) | 5.99 |
| f3 (mm) | 8.17 | TTL (mm) | 5.44 |
| f4 (mm) | −4.80 | HFOV (°) | 22.4 |
| f5 (mm) | −11.39 | | |

Figures 20A, 20B:
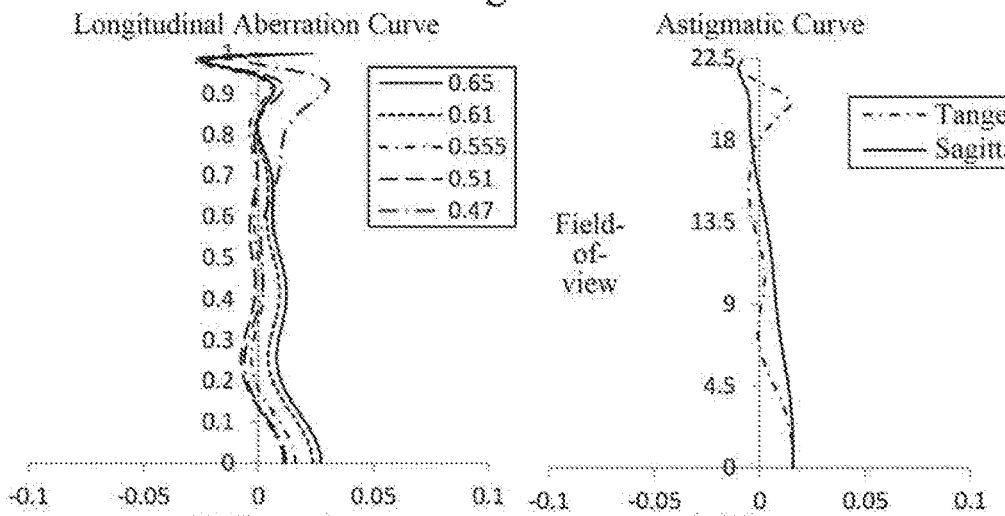
FIGS. 20A to 20C illustrates a longitudinal aberration curve, an astigmatism curve and a distortion curve of the imaging lens assembly according to embodiment 10, respectively.
Figure 20C:
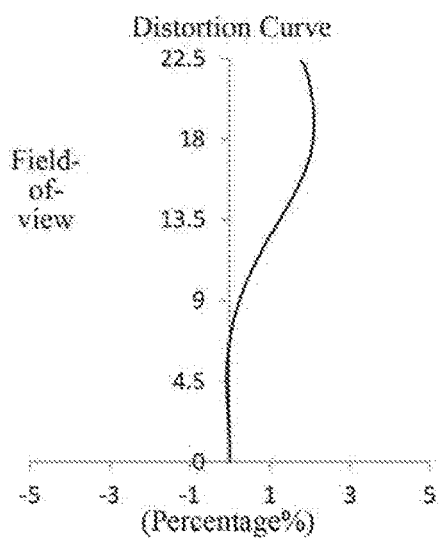

FIG. 20A illustrates a longitudinal aberration curve of the imaging lens assembly according to embodiment 10, representing deviations of focal points converged by light of different wavelengths after passing through the imaging lens assembly. FIG. 20B illustrates an astigmatism curve of the imaging lens assembly according to embodiment 10, representing a curvature of a tangential plane and a curvature of a sagittal plane. FIG. 20C illustrates a distortion curve of the imaging lens assembly according to embodiment 10, representing amounts of distortion corresponding to different FOVs. It can be seen from FIG. 20A to FIG. 20C that the imaging lens assembly provided in embodiment 10 can achieve a good imaging quality.

Embodiment 11

Figure 21:
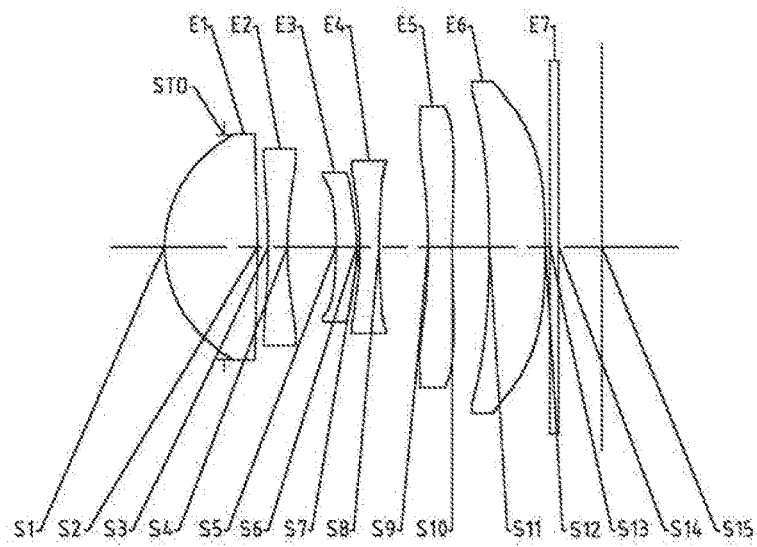
FIG. 21 is a schematic structural view of an imaging lens assembly according to embodiment 11 of the present disclosure.

An imaging lens assembly according to embodiment 11 of the present disclosure is described below with reference to FIG. 21 to FIG. 22C. FIG. 21 is a schematic structural view of the imaging lens assembly according to embodiment 11 of the present disclosure.

As shown in FIG. 21, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a concave surface. The sixth lens E6 has a positive refractive power, and an object-side surface S11 thereof is a concave surface, and an image-side surface S12 thereof is a convex surface. The optical filter E7 has an object-side surface S13 and an image-side surface S14. Light from the object sequentially passes through the respective surfaces S1 to S14 and is finally imaged on the imaging plane S15.

Table 31 shows the surface type, radius of curvature, thickness, material and conic coefficient of each lens of the imaging lens assembly in embodiment 11, wherein the units for the radius of curvature and the thickness are millimeter (mm). Table 32 shows high-order coefficients applicable to each aspheric surface in embodiment 11, wherein the surface shape of each aspheric surface can be defined by the formula (1) given in the above embodiment 1. Table 33 shows effective focal lengths f1 to f6 of respective lens, a total effective focal length f of the imaging lens assembly, a distance TTL along the optical axis from a center of the object-side surface S1 of the first lens E1 to the imaging plane S15, and half of a maximal field-of-view HFOV of the imaging lens assembly in embodiment 11.

TABLE 31

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.7412 | | | |
| S1 | aspheric | 1.5205 | 1.1614 | 1.55 | 56.1 | −0.3036 |
| S2 | aspheric | −12.7212 | 0.1310 | | | 26.3829 |
| S3 | aspheric | −9.5843 | 0.2400 | 1.67 | 19.4 | −36.0804 |
| S4 | aspheric | 3.8364 | 0.6068 | | | −70.3753 |
| S5 | aspheric | −5.7528 | 0.2568 | 1.67 | 20.4 | −10.7860 |
| S6 | aspheric | −2.8170 | 0.0383 | | | −86.0420 |
| S7 | aspheric | −7.4557 | 0.2400 | 1.55 | 56.1 | −68.3678 |
| S8 | aspheric | 4.0493 | 0.6060 | | | −19.1354 |
| S9 | aspheric | −8.0478 | 0.2951 | 1.55 | 56.1 | 0.0000 |
| S10 | aspheric | 21.5088 | 0.4604 | | | 0.0000 |
| S11 | aspheric | −20.0000 | 0.6987 | 1.64 | 23.5 | 18.1038 |
| S12 | aspheric | −18.0000 | 0.0569 | | | 0.0000 |
| S13 | spherical | infinite | 0.1100 | 1.52 | 64.2 | |
| S14 | spherical | infinite | 0.5387 | | | |
| S15 | spherical | infinite | | | | |

TABLE 32

| Surface number | A4 | A6 | A8 | A10 | A12 | A14 | A16 | A18 | A20 |
|---|---|---|---|---|---|---|---|---|---|
| S1 | 1.0670E−02 | −1.8313E−02 | 6.1371E−02 | −9.4368E−02 | 8.1675E−02 | −3.3965E−02 | 1.3040E−03 | 3.9046E−03 | −9.9460E−04 |
| S2 | −1.3915E−02 | 1.4631E−01 | −3.4414E−01 | 5.8273E−01 | −7.0391E−01 | 5.6469E−01 | −2.8189E−01 | 7.8318E−02 | −9.1421E−03 |
| S3 | −1.1458E−01 | 4.0186E−01 | −8.2412E−01 | 1.2883E+00 | −1.5234E+00 | 1.2778E+00 | −6.9839E−01 | 2.1969E−01 | −2.9794E−02 |
| S4 | 2.1342E−02 | 8.6659E−02 | −4.2165E−01 | 1.4090E+00 | −3.1561E+00 | 4.3999E+00 | −3.6705E+00 | 1.6771E+00 | −3.2362E−01 |
| S5 | −6.4833E−02 | −3.2556E−01 | 3.1387E+00 | −1.6588E+01 | 4.9346E+01 | −9.1412E+01 | 1.0308E+02 | −6.4687E+01 | 1.7293E+01 |
| S6 | −4.9545E−01 | 2.4946E+00 | −7.3295E+00 | 1.3652E+01 | −1.6156E+01 | 1.1866E+01 | −5.7961E+00 | 2.2251E+00 | −5.4199E−01 |
| S7 | −4.1243E−01 | 1.3849E+00 | −2.2532E+00 | −1.8697E+00 | 1.8170E+01 | −3.8496E+01 | 4.0066E+01 | −2.1331E+01 | 4.6819E+00 |
| S8 | −2.7509E−01 | 6.2655E−01 | −1.2839E+00 | 2.4907E+00 | −3.4035E+00 | 3.2992E+00 | −2.2755E+00 | 9.7727E−01 | −1.8751E−01 |
| S9 | −8.2191E−03 | −2.7100E−02 | 6.5198E−02 | −1.2423E−01 | 1.7462E−01 | −1.3634E−01 | 5.7654E−02 | −1.2520E−02 | 1.0994E−03 |
| S10 | −3.9498E−03 | 7.8295E−03 | −3.5420E−02 | 3.9766E−02 | −2.5125E−02 | 1.0991E−02 | −3.4307E−03 | 6.5097E−04 | −5.3346E−05 |
| S11 | −4.0874E−02 | 3.7101E−02 | −1.4797E−02 | −1.5647E−03 | 3.7390E−03 | −1.5004E−03 | 2.9185E−04 | −2.8615E−05 | 1.1312E−06 |
| S12 | −7.7477E−02 | 4.8171E−02 | −3.2081E−02 | 1.8714E−02 | −8.7712E−03 | 2.8433E−03 | −5.7938E−04 | 6.6241E−05 | −3.1889E−06 |

TABLE 33

| f1 (mm) | 2.56 | f6 (mm) | 246.1 |
|---|---|---|---|
| f2 (mm) | −4.02 | f (mm) | 5.99 |
| f3 (mm) | 8.01 | TTL (mm) | 5.44 |
| f4 (mm) | −4.77 | HFOV (°) | 22.4 |
| f5 (mm) | −10.69 | | |

Figures 22A, 22B:
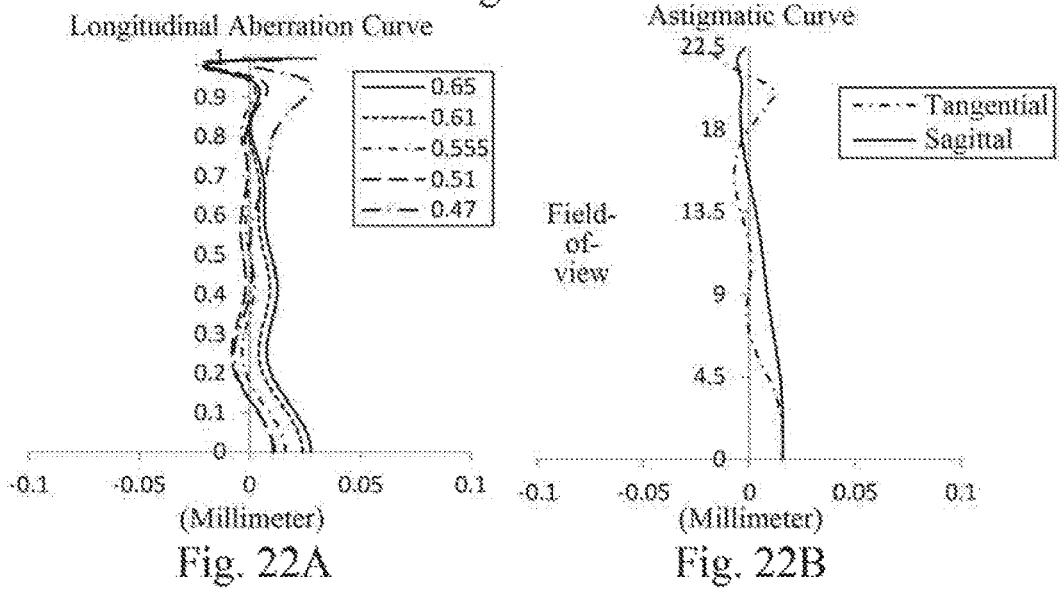
FIGS. 22A to 22C illustrates a longitudinal aberration curve, an astigmatism curve and a distortion curve of the imaging lens assembly according to embodiment 11, respectively.
Figure 22C:
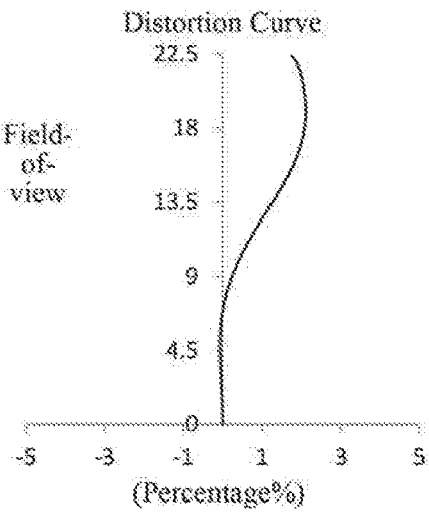

FIG. 22A illustrates a longitudinal aberration curve of the imaging lens assembly according to embodiment 11, representing deviations of focal points converged by light of different wavelengths after passing through the imaging lens assembly. FIG. 22B illustrates an astigmatism curve of the imaging lens assembly according to embodiment 11, representing a curvature of a tangential plane and a curvature of a sagittal plane. FIG. 22C illustrates a distortion curve of the imaging lens assembly according to embodiment 11, representing amounts of distortion corresponding to different FOVs. It can be seen from FIG. 22A to FIG. 22C that the imaging lens assembly provided in embodiment 11 can achieve a good imaging quality.

Embodiment 12

Figure 23:
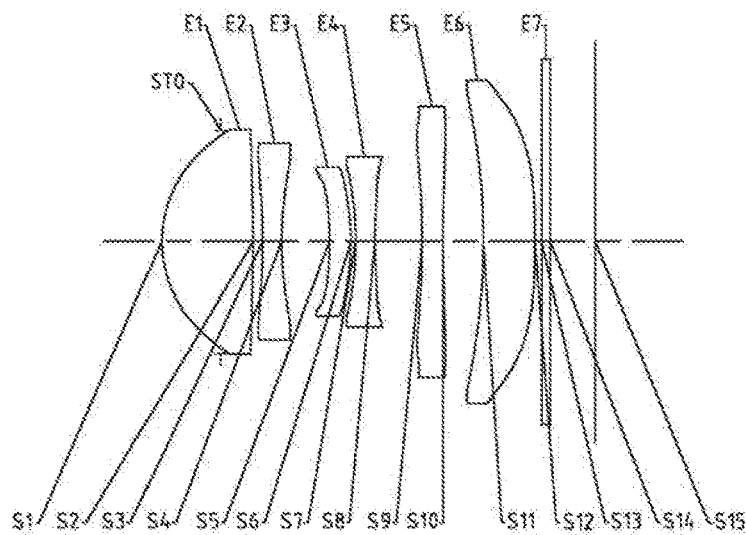
FIG. 23 is a schematic structural view of an imaging lens assembly according to embodiment 12 of the present disclosure.

An imaging lens assembly according to embodiment 12 of the present disclosure is described below with reference to FIG. 23 to FIG. 24C. FIG. 23 is a schematic structural view of the imaging lens assembly according to embodiment 12 of the present disclosure.

As shown in FIG. 23, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a concave surface. The sixth lens E6 has a negative refractive power, and an object-side surface S11 thereof is a concave surface, and an image-side surface S12 thereof is a convex surface. The optical filter E7 has an object-side surface S13 and an image-side surface S14. Light from the object sequentially passes through the respective surfaces S1 to S14 and is finally imaged on the imaging plane S15.

Table 34 shows the surface type, radius of curvature, thickness, material and conic coefficient of each lens of the imaging lens assembly in embodiment 12, wherein the units for the radius of curvature and the thickness are millimeter (mm). Table 35 shows high-order coefficients applicable to each aspheric surface in embodiment 12, wherein the surface shape of each aspheric surface can be defined by the formula (1) given in the above embodiment 1. Table 36 shows effective focal lengths f1 to f6 of respective lens, a total effective focal length f of the imaging lens assembly, a distance TTL along the optical axis from a center of the object-side surface S1 of the first lens E1 to the imaging plane S15, and half of a maximal field-of-view HFOV of the imaging lens assembly in embodiment 12.

TABLE 34

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.7412 | | | |
| S1 | aspheric | 1.5288 | 1.1513 | 1.55 | 56.1 | −0.3082 |
| S2 | aspheric | −12.4629 | 0.1168 | | | 25.1341 |
| S3 | aspheric | −9.4432 | 0.2400 | 1.67 | 19.4 | −41.1914 |
| S4 | aspheric | 3.9110 | 0.6014 | | | −70.0369 |
| S5 | aspheric | −5.8547 | 0.2722 | 1.67 | 20.4 | −13.2925 |
| S6 | aspheric | −2.7606 | 0.0595 | | | −76.5665 |
| S7 | aspheric | −6.2739 | 0.2400 | 1.55 | 56.1 | −46.3318 |
| S8 | aspheric | 4.2450 | 0.5872 | | | −17.1824 |
| S9 | aspheric | −12.3015 | 0.2543 | 1.55 | 56.1 | 0.0000 |
| S10 | aspheric | 21.3961 | 0.5087 | | | 0.0000 |
| S11 | aspheric | −15.0000 | 0.6489 | 1.64 | 23.5 | −17.6124 |
| S12 | aspheric | −30.0000 | 0.0839 | | | 0.0000 |
| S13 | spherical | infinite | 0.1100 | 1.52 | 64.2 | |
| S14 | spherical | infinite | 0.5658 | | | |
| S15 | spherical | infinite | | | | |

TABLE 35

| Surface number | A4 | A6 | A8 | A10 | A12 | A14 | A16 | A18 | A20 |
|---|---|---|---|---|---|---|---|---|---|
| S1 | 9.0951E−03 | −4.8627E−03 | 1.7754E−02 | −1.5114E−02 | −2.5591E−03 | 1.7780E−02 | −1.5586E−02 | 6.0877E−03 | −9.6330E−04 |
| S2 | −7.0716E−03 | 1.0583E−01 | −2.3205E−01 | 4.0605E−01 | −5.5361E−01 | 5.1433E−01 | −2.9824E−01 | 9.6277E−02 | −1.3097E−02 |
| S3 | −9.6634E−02 | 2.7966E−01 | −3.8094E−01 | 2.7388E−01 | −2.6603E−02 | −1.2996E−01 | 1.1137E−01 | −3.8224E−02 | 4.8673E−03 |
| S4 | 3.4869E−02 | −4.9186E−02 | 2.7493E−01 | −7.4506E−01 | 1.0515E+00 | −8.0331E−01 | 2.6651E−01 | 1.6944E−02 | −2.5090E−02 |
| S5 | −8.0088E−02 | −2.6988E−01 | 2.8107E+00 | −1.5345E+01 | 4.7635E+01 | −9.1845E+01 | 1.0670E+02 | −6.8263E+01 | 1.8479E+01 |
| S6 | −4.9221E−01 | 2.4561E+00 | −8.5809E+00 | 2.2180E+01 | −4.0713E+01 | 5.0116E+01 | −3.9687E+01 | 1.8445E+01 | −3.8248E+00 |
| S7 | −3.8076E−01 | 1.2980E+00 | −3.0546E+00 | 4.3203E+00 | 1.2977E−01 | −1.1559E+01 | 1.8404E+01 | −1.2569E+01 | 3.3417E+00 |
| S8 | −2.8241E−01 | 7.9702E−01 | −2.3622E+00 | 6.2472E+00 | −1.1322E+01 | 1.3535E+01 | −1.0221E+01 | 4.3841E+00 | −8.0849E−01 |
| S9 | −5.1761E−03 | −2.6465E−02 | 6.3961E−02 | −1.3165E−01 | 1.8870E−01 | −1.4749E−01 | 6.2204E−02 | −1.3420E−02 | 1.1634E−03 |
| S10 | 2.9744E−04 | 1.1438E−02 | −3.8968E−02 | 5.3091E−02 | −4.7030E−02 | 2.8812E−02 | −1.1289E−02 | 2.4510E−03 | −2.2044E−04 |
| S11 | −4.3995E−02 | 1.6919E−02 | 1.6514E−02 | −2.1615E−02 | 1.0910E−02 | −3.0131E−03 | 4.7492E−04 | −4.0032E−05 | 1.4004E−06 |
| S12 | −7.3340E−02 | 3.7179E−02 | −2.6803E−02 | 1.9146E−02 | −9.9453E−03 | 3.2732E−03 | −6.5117E−04 | 7.1675E−05 | −3.3075E−06 |

TABLE 36

| f1 (mm) | 2.57 | f6 (mm) | −47.43 |
|---|---|---|---|
| f2 (mm) | −4.06 | f (mm) | 5.99 |
| f3 (mm) | 7.58 | TTL (mm) | 5.44 |
| f4 (mm) | −4.60 | HFOV (°) | 22.4 |
| f5 (mm) | −14.27 | | |

Figures 24A, 24B:
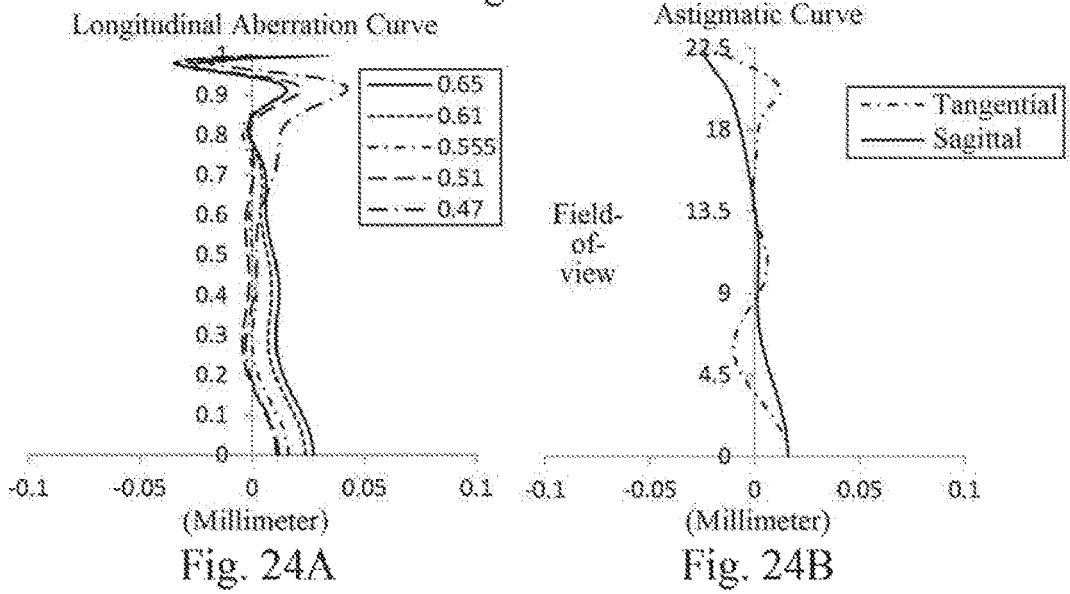
FIGS. 24A to 24C illustrates a longitudinal aberration curve, an astigmatism curve and a distortion curve of the imaging lens assembly according to embodiment 12, respectively.
Figure 24C:
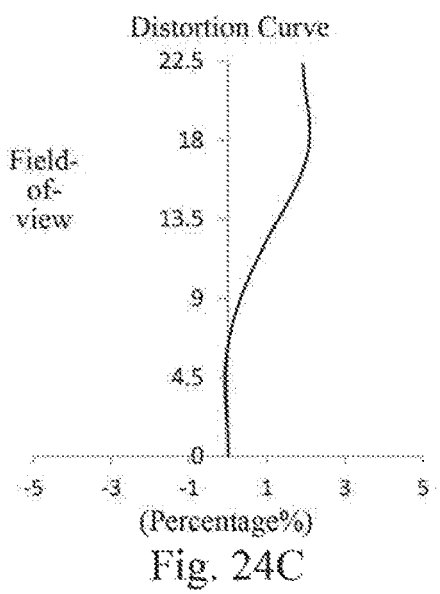

FIG. 24A illustrates a longitudinal aberration curve of the imaging lens assembly according to embodiment 12, representing deviations of focal points converged by light of different wavelengths after passing through the imaging lens assembly. FIG. 24B illustrates an astigmatism curve of the imaging lens assembly according to embodiment 12, representing a curvature of a tangential plane and a curvature of a sagittal plane. FIG. 24C illustrates a distortion curve of the imaging lens assembly according to embodiment 12, representing amounts of distortion corresponding to different FOVs. It can be seen from FIG. 24A to FIG. 24C that the imaging lens assembly provided in embodiment 12 can achieve a good imaging quality.

Embodiment 13

An imaging lens assembly according to embodiment 13 of the present disclosure is described below with reference to FIG. 25 to FIG. 26C. FIG. 25 is a schematic structural view of the imaging lens assembly according to embodiment 13 of the present disclosure.

As shown in FIG. 25, the imaging lens assembly according to an exemplary implementation of the present disclosure includes, sequentially from an object side to an image side along an optical axis, a stop STO, a first lens E1, a second lens E2, a third lens E3, a fourth lens E4, a fifth lens E5, a sixth lens E6, an optical filter E7 and an imaging plane S15.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a concave surface. The sixth lens E6 has a negative refractive power, and an object-side surface S11 thereof is a concave surface, and an image-side surface S12 thereof is a convex surface. The optical filter E7 has an object-side surface S13 and an image-side surface S14. Light from the object sequentially passes through the respective surfaces S1 to S14 and is finally imaged on the imaging plane S15.

Table 37 shows the surface type, radius of curvature, thickness, material and conic coefficient of each lens of the imaging lens assembly in embodiment 13, wherein the units for the radius of curvature and the thickness are millimeter (mm). Table 38 shows high-order coefficients applicable to each aspheric surface in embodiment 13, wherein the surface shape of each aspheric surface can be defined by the formula (1) given in the above embodiment 1. Table 39 shows effective focal lengths f1 to f6 of respective lens, a total effective focal length f of the imaging lens assembly, a distance TTL along the optical axis from a center of the object-side surface S1 of the first lens E1 to the imaging plane S15, and half of a maximal field-of-view HFOV of the imaging lens assembly in embodiment 13.

TABLE 37

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.7412 | | | |
| S1 | aspheric | 1.5240 | 1.1555 | 1.55 | 56.1 | −0.3073 |
| S2 | aspheric | −12.7481 | 0.1208 | | | 25.5162 |
| S3 | aspheric | −9.6437 | 0.2400 | 1.67 | 19.4 | −40.7049 |
| S4 | aspheric | 3.8676 | 0.6032 | | | −70.2360 |
| S5 | aspheric | −5.8185 | 0.2666 | 1.67 | 20.4 | −12.0527 |
| S6 | aspheric | −2.8022 | 0.0536 | | | −80.9933 |
| S7 | aspheric | −6.6074 | 0.2400 | 1.55 | 56.1 | −46.1660 |
| S8 | aspheric | 4.2620 | 0.5861 | | | −17.7560 |
| S9 | aspheric | −10.5036 | 0.2539 | 1.55 | 56.1 | 0.0000 |
| S10 | aspheric | 17.4262 | 0.4781 | | | 0.0000 |
| S11 | aspheric | −20.0000 | 0.6756 | 1.64 | 23.5 | −18.9529 |
| S12 | aspheric | −25.0000 | 0.0874 | | | 0.0000 |
| S13 | spherical | infinite | 0.1100 | 1.52 | 64.2 | |
| S14 | spherical | infinite | 0.5692 | | | |
| S15 | spherical | infinite | | | | |

TABLE 38

| Surface number | A4 | A6 | A8 | A10 | A12 | A14 | A16 | A18 | A20 |
|---|---|---|---|---|---|---|---|---|---|
| S1 | 9.9287E−03 | −1.0432E−02 | 3.4218E−02 | −4.2234E−02 | 2.2188E−02 | 6.5032E−03 | −1.4369E−02 | 6.9181E−03 | −1.1891E−03 |
| S2 | −9.3698E−03 | 1.2521E−01 | −3.1245E−01 | 5.8300E−01 | −7.7601E−01 | 6.7797E−01 | −3.6599E−01 | 1.1005E−01 | −1.4006E−02 |
| S3 | −1.0075E−01 | 3.1474E−01 | −5.4727E−01 | 7.2126E−01 | −7.3934E−01 | 5.5999E−01 | −2.8668E−01 | 8.7218E−02 | −1.1705E−02 |
| S4 | 3.2687E−02 | −6.1276E−03 | −1.7383E−02 | 2.8256E−01 | −1.0763E+00 | 1.8940E+00 | −1.7908E+00 | 8.8322E−01 | −1.7968E−01 |
| S5 | −7.9243E−02 | −2.6414E−01 | 2.8376E+00 | −1.5853E+01 | 4.9993E+01 | −9.7733E+01 | 1.1515E+02 | −7.4765E+01 | 2.0532E+01 |
| S6 | −4.9353E−01 | 2.5116E+00 | −8.6382E+00 | 2.1565E+01 | −3.8077E+01 | 4.5258E+01 | −3.4810E+01 | 1.5815E+01 | −3.2240E+00 |
| S7 | −3.9627E−01 | 1.4764E+00 | −3.9645E+00 | 6.9696E+00 | −4.7557E+00 | −5.6819E+00 | 1.3971E+01 | −1.0719E+01 | 3.0289E+00 |
| S8 | −2.8207E−01 | 7.8352E−01 | −2.2224E+00 | 5.5853E+00 | −9.6290E+00 | 1.1024E+01 | −8.0553E+00 | 3.3745E+00 | −6.1147E−01 |
| S9 | −4.4976E−03 | −2.7501E−02 | 6.7876E−02 | −1.3775E−01 | 1.9499E−01 | −1.5190E−01 | 6.4175E−02 | −1.3925E−02 | 1.2196E−03 |
| S10 | −1.5928E−03 | 1.1158E−02 | −3.3284E−02 | 4.8897E−02 | −4.0118E−02 | 2.3163E−02 | −8.7563E−03 | 1.8575E−03 | −1.6382E−04 |
| S11 | −4.7248E−02 | 3.0610E−02 | 8.1571E−04 | −1.2172E−02 | 7.5898E−03 | −2.3291E−03 | 3.9614E−04 | −3.5568E−05 | 1.3151E−06 |
| S12 | −7.8521E−02 | 4.5765E−02 | −3.2076E−02 | 2.0736E−02 | −1.0044E−02 | 3.1854E−03 | −6.1998E−04 | 6.7060E−05 | −3.0394E−06 |

TABLE 39

| | | | |
|---|---|---|---|
| f1 (mm) | 2.57 | f6 (mm) | −164.1 |
| f2 (mm) | −4.05 | f (mm) | 5.99 |
| f3 (mm) | 7.84 | TTL (mm) | 5.44 |

TABLE 39-continued

| | | | |
|---|---|---|---|
| f4 (mm) | −4.71 | HFOV (°) | 22.4 |
| f5 (mm) | −11.97 | | |

FIG. 26A illustrates a longitudinal aberration curve of the imaging lens assembly according to embodiment 13, representing deviations of focal points converged by light of different wavelengths after passing through the imaging lens assembly. FIG. 26B illustrates an astigmatism curve of the imaging lens assembly according to embodiment 13, representing a curvature of a tangential plane and a curvature of a sagittal plane. FIG. 26C illustrates a distortion curve of the imaging lens assembly according to embodiment 13, representing amounts of distortion corresponding to different FOVs. It can be seen from FIG. 26A to FIG. 26C that the imaging lens assembly provided in embodiment 13 can achieve a good imaging quality.

In view of the above, embodiments 1 to 13 respectively satisfy the relationship shown in Table 40.

TABLE 40

| Formula\Embodiment | 1 | 2 | 3 | 4 | 5 | 6 | 7 | 8 | 9 | 10 | 11 | 12 | 13 |
|---|---|---|---|---|---|---|---|---|---|---|---|---|---|
| f/ImgH | 2.29 | 2.27 | 2.28 | 2.27 | 2.28 | 2.28 | 2.28 | 2.40 | 2.40 | 2.40 | 2.40 | 2.40 | 2.40 |
| f/T23 | 10.15 | 10.02 | 10.03 | 9.99 | 10.01 | 10.01 | 10.01 | 10.03 | 10.04 | 9.90 | 9.87 | 9.96 | 9.93 |
| f12/CT1 | 4.12 | 4.10 | 4.14 | 3.90 | 3.90 | 4.14 | 4.15 | 3.90 | 3.91 | 3.73 | 3.72 | 3.79 | 3.76 |
| (T45 + T56)/ΣAT | 0.57 | 0.60 | 0.61 | 0.61 | 0.61 | 0.63 | 0.63 | 0.61 | 0.61 | 0.58 | 0.58 | 0.58 | 0.58 |
| f/f3 | 0.99 | 0.83 | 0.95 | 0.85 | 0.90 | 0.89 | 0.76 | 0.84 | 0.83 | 0.73 | 0.75 | 0.79 | 0.76 |
| f/f4 | −1.37 | −1.26 | −1.37 | −1.27 | −1.31 | −1.29 | −1.15 | −1.33 | −1.33 | −1.25 | −1.26 | −1.30 | −1.27 |
| \|f/f5\| + \|f/f6\| | 0.84 | 0.64 | 0.72 | 0.76 | 0.75 | 0.75 | 0.77 | 0.70 | 0.81 | 0.53 | 0.58 | 0.55 | 0.54 |
| R5/R8 | −1.29 | −1.01 | −0.96 | −0.93 | −1.02 | −0.79 | −0.76 | −1.16 | −1.17 | −1.38 | −1.42 | −1.38 | −1.37 |
| R6/R7 | 0.49 | 0.55 | 0.59 | 0.57 | 0.56 | 0.61 | 0.56 | 0.54 | 0.54 | 0.40 | 0.38 | 0.44 | 0.42 |
| f/R2 | −0.55 | −0.53 | −0.48 | −0.55 | −0.54 | −0.29 | −0.21 | −0.55 | −0.56 | −0.47 | −0.47 | −0.48 | −0.47 |
| \|f/R9\| + \|f/R10\| | 0.30 | 1.03 | 0.97 | 1.13 | 1.04 | 0.84 | 0.82 | 1.00 | 1.10 | 0.96 | 1.02 | 0.77 | 0.91 |
| \|f/R11\| + \|f/R12\| | 1.13 | 0.73 | 0.68 | 0.81 | 0.79 | 0.57 | 0.50 | 1.19 | 1.36 | 0.60 | 0.63 | 0.60 | 0.54 |
| f/EPD | 2.28 | 2.28 | 2.28 | 2.18 | 2.19 | 2.48 | 2.48 | 2.18 | 2.18 | 2.19 | 2.19 | 2.19 | 2.19 |
| TTL/ImgH | 2.07 | 2.07 | 2.07 | 2.07 | 2.07 | 2.07 | 2.07 | 2.18 | 2.18 | 2.18 | 2.18 | 2.18 | 2.18 |
| CT3/CT2 | 1.20 | 1.23 | 1.20 | 1.17 | 1.20 | 1.19 | 1.08 | 1.07 | 1.13 | 1.11 | 1.20 | 1.23 | 1.20 |
| CT5/CT4 | 1.22 | 1.21 | 1.21 | 1.22 | 1.41 | 1.47 | 1.15 | 1.23 | 1.06 | 1.06 | 1.22 | 1.21 | 1.21 |
| TTL/f | 0.90 | 0.91 | 0.91 | 0.91 | 0.91 | 0.91 | 0.91 | 0.91 | 0.91 | 0.91 | 0.91 | 0.91 | 0.91 |
| f/R1 | 3.85 | 3.86 | 3.93 | 3.93 | 3.85 | 3.85 | 3.94 | 3.94 | 3.92 | 3.93 | 3.85 | 3.86 | 3.93 |
| (R1 + R2)/(R1 − R2) | −0.75 | −0.76 | −0.78 | −0.75 | −0.75 | −0.86 | −0.90 | −0.75 | −0.75 | −0.79 | −0.79 | −0.78 | −0.79 |
| ΣCT/ΣAT | 1.50 | 1.34 | 1.33 | 1.36 | 1.36 | 1.30 | 1.26 | 1.35 | 1.35 | 1.56 | 1.57 | 1.50 | 1.54 |
| R8/R6 | −1.89 | −2.12 | −2.37 | −2.31 | −2.19 | −2.72 | −2.59 | −1.87 | −1.85 | −1.47 | −1.44 | −1.54 | −1.52 |
| f/f2 | −1.54 | −1.50 | −1.47 | −1.48 | −1.49 | −1.35 | −1.31 | −1.49 | −1.49 | −1.48 | −1.49 | −1.48 | −1.48 |
| R7/f2 | 1.29 | 1.21 | 1.01 | 1.13 | 1.14 | 0.93 | 1.06 | 1.23 | 1.23 | 1.77 | 1.85 | 1.55 | 1.63 |
| CT6/(CT3 + CT4) | 0.87 | 0.87 | 0.99 | 0.97 | 0.96 | 1.01 | 1.01 | 0.89 | 0.86 | 1.38 | 1.41 | 1.27 | 1.33 |
| (T23 + T34)/CT6 | 1.35 | 1.45 | 1.25 | 1.29 | 1.30 | 1.22 | 1.23 | 1.41 | 1.46 | 0.95 | 0.92 | 1.02 | 0.97 |
| CT2/T12 | 2.28 | 2.23 | 2.14 | 2.22 | 2.17 | 2.10 | 2.09 | 2.13 | 2.13 | 1.89 | 1.83 | 2.05 | 1.99 |
| f1/R1 | 1.65 | 1.66 | 1.68 | 1.66 | 1.66 | 1.73 | 1.76 | 1.66 | 1.66 | 1.68 | 1.68 | 1.68 | 1.69 |
| \|f2/CT2\|/f | 2.68 | 2.79 | 2.84 | 2.81 | 2.80 | 3.08 | 3.19 | 2.81 | 2.80 | 2.81 | 2.80 | 2.82 | 2.82 |
| f/(EPD*f1*2) | 0.52 | 0.51 | 0.51 | 0.53 | 0.53 | 0.46 | 0.45 | 0.53 | 0.53 | 0.53 | 0.54 | 0.53 | 0.53 |
| (\|R3\| + R4)/f | 1.99 | 2.05 | 2.18 | 2.06 | 2.07 | 2.84 | 3.27 | 2.07 | 2.07 | 2.25 | 2.24 | 2.23 | 2.26 |

The present disclosure further provides an imaging apparatus, having a photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the imaging lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An imaging lens assembly comprising, sequentially from an object side of the imaging lens assembly to an image side of the imaging lens assembly along an optical axis, a first lens, a second lens, a third lens, a fourth lens, a fifth lens and a sixth lens, wherein:
   the first lens has a positive refractive power;
   the second lens has a negative refractive power, and both of an object-side surface and an image-side surface of the second lens are concave surfaces;
   the third lens has a positive refractive power, and an image-side surface of the third lens is a convex surface;
   the fourth lens has a negative refractive power, and an object-side surface of the fourth lens is a concave surface;
   each of the fifth lens and the sixth lens has a positive refractive power or a negative refractive power;
   a total effective focal length f of the imaging lens assembly and half of a diagonal length ImgH of an effective pixel area on an imaging plane of the imaging lens assembly satisfy $2.0 \leq f/ImgH \leq 3.0$;
   the total effective focal length f of the imaging lens assembly and a spaced distance T23 along the optical axis between the second lens and the third lens satisfy $8 < f/T23 < 12$;
   a combined focal length f12 of the first lens and the second lens and a center thickness CT1 along the optical axis of the first lens satisfy $3 < f12/CT1 < 4.5$; and
   the total effective focal length f of the imaging lens assembly and an effective focal length f3 of the third lens satisfy $0.6 < f/f3 \leq 1.0$.

2. The imaging lens assembly according to claim 1, wherein a spaced distance T45 along the optical axis between the fourth lens and the fifth lens, a spaced distance T56 along the optical axis between the fifth lens and the sixth lens, and a sum of spaced distances ΣAT along the optical axis between two adjacent lenses of the first lens to the sixth lens satisfy $0.5 \leq (T45+T56)/\Sigma AT < 0.9$.

3. The imaging lens assembly according to claim 1, wherein a radius of curvature R6 of the image-side surface of the third lens and a radius of curvature R7 of the object-side surface of the fourth lens satisfy $0 < R6/R7 < 1.0$.

4. The imaging lens assembly according to claim 3, wherein the total effective focal length f of the imaging lens assembly and an effective focal length f4 of the fourth lens satisfy $-1.5 < f/f4 < -1.0$.

5. The imaging lens assembly according to claim 1, wherein the total effective focal length f of the imaging lens assembly, a radius of curvature R11 of an object-side surface of the sixth lens and a radius of curvature R12 of an image-side surface of the sixth lens satisfy $0.5 \leq |f/R11|+|f/R12| < 1.5$.

6. The imaging lens assembly according to claim 5, wherein the total effective focal length f of the imaging lens assembly, an effective focal length f5 of the fifth lens and an effective focal length f6 of the sixth lens satisfy $0.5 \leq |f/f5|+|f/f6| < 1.0$.

7. The imaging lens assembly according to claim 1, wherein the total effective focal length f of the imaging lens assembly and an entrance pupil diameter EPD of the imaging lens assembly satisfy $f/EPD < 2.5$.

8. An imaging lens assembly comprising, sequentially from an object side of the imaging lens assembly to an image side of the imaging lens assembly along an optical axis, a first lens, a second lens, a third lens, a fourth lens, a fifth lens and a sixth lens, wherein:
   the first lens has a positive refractive power;
   the second lens has a negative refractive power, and both of an object-side surface and an image-side surface of the second lens are concave surfaces;
   the third lens has a positive refractive power, and an image-side surface of the third lens is a convex surface;
   the fourth lens has a negative refractive power, and an object-side surface of the fourth lens is a concave surface;
   each of the fifth lens and the sixth lens has a positive refractive power or a negative refractive power; and
   an effective focal length f of the imaging lens assembly, an effective focal length f5 of the fifth lens and an effective focal length f6 of the sixth lens satisfy $0.5 \leq |f/f5|+|f/f6| < 1.0$;
   the total effective focal length f of the imaging lens assembly and a spaced distance T23 along the optical axis between the second lens and the third lens satisfy $8 < f/T23 < 12$;
   a combined focal length f12 of the first lens and the second lens and a center thickness CT1 along the optical axis of the first lens satisfy $3 < f12/CT1 < 4.5$; and
   the total effective focal length f of the imaging lens assembly and an effective focal length f3 of the third lens satisfy $0.6 < f/f3 \leq 1.0$.

9. The imaging lens assembly according to claim 8, wherein the total effective focal length f of the imaging lens assembly and a radius of curvature R2 of an image-side surface of the first lens satisfy $-1.0 < f/R2 < 0$.

10. The imaging lens assembly according to claim 8, wherein a radius of curvature R5 of an object-side surface of the third lens and a radius of curvature R8 of an image-side surface of the fourth lens satisfy $-1.5 < R5/R8 < -0.5$.

11. The imaging lens assembly according to claim 8, wherein a radius of curvature R6 of the image-side surface of the third lens and a radius of curvature R7 of the object-side surface of the fourth lens satisfy $0 < R6/R7 < 1.0$.

12. The imaging lens assembly according to claim 8, wherein the total effective focal length f of the imaging lens assembly, a radius of curvature R9 of an object-side surface of the fifth lens and a radius of curvature R10 of an image-side surface of the fifth lens satisfy $|f/R9|+|f/R10| < 1.2$.

13. The imaging lens assembly according to claim 8, wherein the total effective focal length f of the imaging lens assembly, a radius of curvature R11 of an object-side surface of the sixth lens and a radius of curvature R12 of an image-side surface of the sixth lens satisfy $0.5 \leq |f/R11|+|f/R12| < 1.5$.

14. The imaging lens assembly according to claim 8, wherein the total effective focal length f of the imaging lens assembly and an entrance pupil diameter EPD of the imaging lens assembly satisfy $f/EPD < 2.5$.

* * * * *